United States Patent
Li et al.

(10) Patent No.: US 10,681,150 B2
(45) Date of Patent: Jun. 9, 2020

(54) SYSTEMS AND METHODS FOR MANAGEMENT PLANE—CONTROL PLANE INTERACTION IN SOFTWARE DEFINED TOPOLOGY MANAGEMENT

(71) Applicants: Xu Li, Nepean (CA); Jaya Rao, Ottawa (CA)

(72) Inventors: Xu Li, Nepean (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 15/470,443

(22) Filed: Mar. 27, 2017

(65) Prior Publication Data
US 2017/0288961 A1  Oct. 5, 2017

Related U.S. Application Data

(60) Provisional application No. 62/315,768, filed on Mar. 31, 2016.

(51) Int. Cl.
*H04L 29/08* (2006.01)
*H04W 36/00* (2009.01)
(Continued)

(52) U.S. Cl.
CPC ........ *H04L 67/148* (2013.01); *H04L 12/1877* (2013.01); *H04L 41/046* (2013.01);
(Continued)

(58) Field of Classification Search
CPC ............... H04L 12/1877; H04L 41/046; H04L 41/0803; H04L 41/082; H04L 41/0896;
(Continued)

(56) References Cited

U.S. PATENT DOCUMENTS

| | | | |
|---|---|---|---|
| 2002/0150091 A1 | 10/2002 | Lopponen et al. | |
| 2004/0053627 A1 | 3/2004 | Fiter et al. | |

(Continued)

FOREIGN PATENT DOCUMENTS

| | | | |
|---|---|---|---|
| CN | 101094096 A | 12/2007 | |
| CN | 101452406 A | 6/2009 | |

(Continued)

OTHER PUBLICATIONS

International Search Report dated May 27, 2017 for corresponding International Application No. PCT/CN2017/078886 filed Mar. 30, 2017.

(Continued)

*Primary Examiner* — Saad A. Waqas

(57) ABSTRACT

Embodiments of the present invention provide systems and methods for a Session-level SDT component in the control plane to handle setup, recovery and mobility of individual session requests in real time. The Session-level SDT component may comprise path management that performs either stateless of stateful path switching for an ongoing session, whether download or uplink, according to the stateful requirements of the session. The path management may be in conjunction with user equipment mobility management operation; it may also be in conjunction with network scalability and automation operation, such as load balancing.

20 Claims, 19 Drawing Sheets

(51) Int. Cl.

| | |
|---|---|
| *H04L 12/717* | (2013.01) |
| *H04L 12/24* | (2006.01) |
| *H04W 36/08* | (2009.01) |
| *H04W 36/22* | (2009.01) |
| *H04W 36/32* | (2009.01) |
| *H04W 64/00* | (2009.01) |
| *H04L 12/18* | (2006.01) |
| *H04L 12/751* | (2013.01) |
| *H04W 40/20* | (2009.01) |
| *H04W 76/34* | (2018.01) |
| *H04W 76/22* | (2018.01) |

(52) U.S. Cl.
CPC ........ *H04L 41/082* (2013.01); *H04L 41/0803* (2013.01); *H04L 41/0896* (2013.01); *H04L 41/12* (2013.01); *H04L 41/20* (2013.01); *H04L 41/5025* (2013.01); *H04L 41/5051* (2013.01); *H04L 41/5058* (2013.01); *H04L 45/02* (2013.01); *H04L 45/42* (2013.01); *H04W 36/0011* (2013.01); *H04W 36/08* (2013.01); *H04W 36/22* (2013.01); *H04W 36/32* (2013.01); *H04W 40/205* (2013.01); *H04W 64/006* (2013.01); *H04L 41/5087* (2013.01); *H04W 76/22* (2018.02); *H04W 76/34* (2018.02)

(58) Field of Classification Search
CPC ............... H04L 41/122; H04L 41/5025; H04L 41/5051; H04L 67/148
See application file for complete search history.

(56) References Cited

U.S. PATENT DOCUMENTS

| | | | |
|---|---|---|---|
| 2004/0081128 A1 | 4/2004 | Fiter et al. | |
| 2004/0120474 A1 | 6/2004 | Lopponen et al. | |
| 2005/0141541 A1 | 6/2005 | Cuny et al. | |
| 2005/0260988 A1 | 11/2005 | Kauppinen | |
| 2010/0080186 A1 | 4/2010 | Guo et al. | |
| 2011/0060837 A1 | 3/2011 | Zhai et al. | |
| 2013/0246846 A1 | 9/2013 | Oyman | |
| 2013/0258963 A1* | 10/2013 | Mihaly | H04L 12/4633 370/329 |
| 2014/0362730 A1* | 12/2014 | Zhang | H04L 45/64 370/254 |
| 2015/0026362 A1 | 1/2015 | Guichard et al. | |
| 2015/0327284 A1 | 11/2015 | Wakabayashi et al. | |
| 2015/0381324 A1* | 12/2015 | Mirsky | H04L 1/24 370/241.1 |
| 2016/0203025 A1 | 7/2016 | Yao | |
| 2016/0212652 A1 | 7/2016 | Iwai et al. | |
| 2016/0285735 A1* | 9/2016 | Chen | H04L 45/02 |
| 2016/0337915 A1 | 11/2016 | Tan et al. | |
| 2017/0104609 A1* | 4/2017 | McNamee | H04L 12/4641 |
| 2017/0150420 A1 | 5/2017 | Olsson et al. | |
| 2017/0244619 A1 | 8/2017 | Bhatia et al. | |
| 2017/0250892 A1* | 8/2017 | Cooper | G06F 21/44 |
| 2017/0279923 A1* | 9/2017 | Kumar | H04L 43/16 |
| 2017/0289270 A1 | 10/2017 | Li et al. | |
| 2018/0091395 A1* | 3/2018 | Shinohara | G06F 9/45558 |
| 2018/0167954 A1 | 6/2018 | Wakabayashi | |
| 2018/0227807 A1 | 8/2018 | Youn et al. | |

FOREIGN PATENT DOCUMENTS

| | | |
|---|---|---|
| CN | 101568150 A | 10/2009 |
| CN | 104335175 A | 2/2015 |
| GB | 2530523 A | 3/2016 |
| WO | 2014166399 A1 | 10/2014 |
| WO | 2014197778 A1 | 12/2014 |
| WO | 2016007897 A1 | 1/2016 |

OTHER PUBLICATIONS

International Search Report dated Jun. 5, 2017 for corresponding International Application No. PCT/CN2017/078843 filed Mar. 30, 2017.
China Mobile, "Solution for Enabling (re)selection of efficient user plane paths", SA WG2 Meeting #113AH, Feb. 23-26, 2016, Sophia Antipolis, France.
United States Office Action dated Jul. 27, 2017 for corresponding U.S. Appl. No. 15/470,493, filed Mar. 27, 2017.
3GPP TR 22.864: "Feasibility Study on New Services and Markets Technology Enablers—Network Operation," Feb. 2016.
3GPP TR 22.891: "Study on Architecture for Next Generation System," Feb. 2016.
ETSI GS NFV-REL 002 V1.1.1 (Sep. 2015) "Network Functions Virtualisation (NFV); Reliability; Report on Scalable Architectures for Reliability Management" Group specification.
3rd Generation Partnership Project; Technical Specification Group Services and System Aspects: 3GPP TR 23.799 V0.3.0 (Mar. 2016), Study on Architecture for Next Generation System (Release 14), Mar. 2016.
International Search Report dated Jun. 14, 2017 for corresponding International Application No. PCT/CN2017/078733 filed Mar. 30, 2017.

* cited by examiner

- Address – based
  - Table for incoming packets

| Dest. Address | DC- Internal Address (es) | Type of Cast ** |
  |---|---|---|

- Table for outgoing packets

| (Session ID, Src. Address) | Dest. Address(es) | Type of Cast |
  |---|---|---|

- Non-Address – based
  - Table for incoming traffic

| Logical Link (LL)* | DC- Internal Address (es) | Type of Cast |
  |---|---|---|

- Table for outgoing traffic

| (Session ID, Source Network Address) | LL(s) | Type of Cast |
  |---|---|---|

FIG. 17

- Address – based forwarding
  - Table for incoming packets (migration avoidance rules)

| (Destination, session ID [flow ID]) | New Destination |
|---|---|

- Non-Address – based forwarding
  - Table for incoming traffic (migration avoidance rules)

| (LL, session ID [flow ID]) | New LL* |
|---|---|

FIG. 18

- Example benefits of Session-level SDT

| | With session-level SDT | Without session-level SDT |
|---|---|---|
| SDT/TE modularity | YES | NO |
| SDT/TE independent evaluation | YES | NO |
| TE backward compatibility | YES | NO |

- Architecture design comparison

| | Option 1 (two-level path configuration) | Option 2 (one-level path configuration) |
|---|---|---|
| TE problem complexity | Low | High |
| TE operation frequency | Low | High |
| Signaling overhead | Low | High |

FIG. 19

SYSTEMS AND METHODS FOR MANAGEMENT PLANE—CONTROL PLANE INTERACTION IN SOFTWARE DEFINED TOPOLOGY MANAGEMENT

CROSS-REFERENCE TO RELATED APPLICATIONS

This application claims the benefit of U.S. Provisional Application Ser. No. 62/315,768 titled "Systems and Methods for Software Defined Topology Management" filed on Mar. 31, 2016, which is incorporated by reference herein in its entirety.

TECHNICAL FIELD

This disclosure relates to systems and methods for software defined topology (SDT), and, in particular, to systems and methods for management plane (MP) and control plane (CP) interaction in SDT management.

BACKGROUND

In conventional communication networks, a topology is defined by the location of nodes and the links that interconnect them. As nodes and functions are virtualized, and as logical links can be created between virtualized nodes, the topology of a network, which was once defined solely by the arrangement of physical resources, can be defined by network management entities. Software Defined Topology (SDT), along with other technologies such as Software Defined Networking (SDN), is considered as an enabling technology for the dynamic creation and management of networks. In the context of a next generation network, such as a so-called fifth generation (5G) wireless networks, an SDT management entity can be employed to generate/determine a network logical topology for each service, including (1) virtual function (VF) points of presence (PoP) decision, i.e., physical locations (network addresses) of virtual functions, and (2) logical link decisions, i.e., logical links between service traffic sources, service VF PoPs, and service traffic destinations, and respective resource requirements. A one-to-many connection of PoPs may be due to computing resource constraints at Network Functions Virtualization (NFV) enabled nodes or bandwidth constraints over network links.

Different packet transport networks use different schemes to route traffic over the data plane. For example, some packet transport networks use source routing protocols that allow a sender of a packet to partially or completely specify the pathway over which the packet is transported through the network. Other packet transport networks use non-source routing protocols to switch packets on a link-by-link basis such that en-route nodes are responsible for determining at least a portion of the pathway over which the packet is transported through the network. Different routing schemes may offer different advantages and disadvantages for different network scenarios. For example, source routing protocols may offer low complexity, while non-source routing protocols may provide better overall network performance.

When networks use different schemes to route traffic over the data plane, a network logical topology is determined for each service. This includes decisions related to VF PoPs (based on respective computing resource requirements such as CPU, memory, storage, and I/O interfaces), and local link decisions (logical links between service traffic sources, service VF PoPs, service traffic destinations, and respective quality of service (QoS) requirements such as rate, latency, and jitter). The network logical topology determined for each service is called Service-level SDT.

When networks use different schemes or methods to route traffic over the data plane, a network logical topology is determined for each individual service session (a group of traffic flows). This includes determining logical paths in the network logical topology defined by the Service-level SDT. Decisions for each individual service session are related to the selection of a set of PoPs, from multiple PoPs through which to route the traffic flow. The network logical topology determined for each individual service session is called Session-level SDT.

A restriction on PoPs is that they are not to exceed their data processing capacity. The PoP processing load is subject to incoming traffic. Packets of the same session can be directed through the same unique PoP of a stateful function (a function that stores information related to the function during that particular session). However, in some instances, packets of the same session must be directed through the same unique PoP of a stateful function, which may further impose processing load on the PoP. There is no way to determine and monitor, for individual sessions, the VF PoPs that need to be traversed through with respect to the limited processing capability of PoPs, in order to avoid PoP overloading and for context maintenance of a function's statefulness.

Therefore there is a need for new systems and methods for SDT management that are not subject to one or more deficiencies in the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention provide systems and methods for software defined topology management. Embodiments of the present invention further provide systems and methods for management plane—control plane interaction in software defined topology management. In accordance with an aspect of the present disclosure, a method for configuring a data plane of a communication network. The method includes receiving, by a service-level Software Defined Topology (SDT) component, configuration parameters and resource parameters indicative of communication network operation. The method further includes determining, by the service-level SDT component, a service-level SDT decision based at least in part on the configuration parameters and resource parameters and transmitting, by the service-level SDT component, configuration parameters and resource parameters for use in a session-level SDT determination. The method also includes receiving, by the service-level SDT component, performance indicators and a service request regarding configuration of the data plane.

In accordance with another aspect of the present disclosure there is provided a device having a processor and machine readable memory storing machine executable instructions which when executed by the processor configure the device to perform the above method.

In accordance with another aspect of the present disclosure there is provided a method for configuring a data plane of a communication network. The method includes receiving, by a session level Software Defined Topology (SDT)

component, configuration parameters and resource parameters for use in a session-level SDT determination and determining, by the session-level SDT component, a session-level SDT decision based at least in part on the configuration parameters and resource parameters. The method further includes transmitting, by the session-level SDT component, performance indicators and a service request regarding configuration of the data plane.

In accordance with another aspect of the present disclosure there is provided a device having a processor and machine readable memory storing machine executable instructions which when executed by the processor configure the device to perform the above method.

Another aspect of the disclosure, there is provided a session-level SDT component in the control plane to handle setup, recovery and mobility of individual session requests in real time.

Another aspect of the disclosure provides a method for configuring a data plane of a network, the method comprising configuring an end-to-end service through one or more nodes of the network, receiving a request for a session utilizing the end-to-end service, and establishing a path for the session utilizing path management (PM) configured for session level software defined topology.

In some embodiments, the path is established through nodes hosting virtual functions. In some embodiments, the virtual functions are stateless and the method includes the path management monitoring session status and updating the path of the session as needed and responsive to the monitoring. In some embodiment, the control plane component includes an extended network address translation component which includes a session ID for packets for which network address translation is required when the established path crosses network boundaries.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 17 illustrates tables for packet information organization for the extended ENAT at a DC accordance with embodiments.

FIG. 18 illustrates tables for packet information organization for the extended ENAT at DC with migration avoidance rules in accordance with embodiments, and FIG. 19 illustrates benefits of a Session-level SDT component in the control plane to handle individual session recovery requests in real time in accordance with embodiments.

DETAILED DESCRIPTION

It has been realized that there is no session level Software Defined Topology (SDT) designed within conventional communication networks to address stateful constraints on traffic flows and logical pathway selections. Moreover, there is need for a Session-level SDT in conjunction with Service-level SDT, when a point of presence (PoP) of a virtual function (VF) is connected to multiple PoPs of the next VF (as can be defined in a service function chain).

Embodiments provide system architectures and methods for software defined topology management interworking with network function virtualization (NFV) and software defined networking (SDN) at the service level (Service-level SDT) and session level (Session-level SDT).

In embodiments, the purpose of adapting Session-level SDT is to change the points of presence of stateful functions that an existing flow traverses, while the Service-level SDT decision remains unchanged. The Session-level SDT may be triggered by unacceptable service performance decrease caused by stateful function PoP overloading. The Session-level SDT may reduce the cost or impact of migrating session state information between PoPs, where migration can rely upon dedicated control channels or data plane peer-to-peer flows between PoPs.

Figure 1:
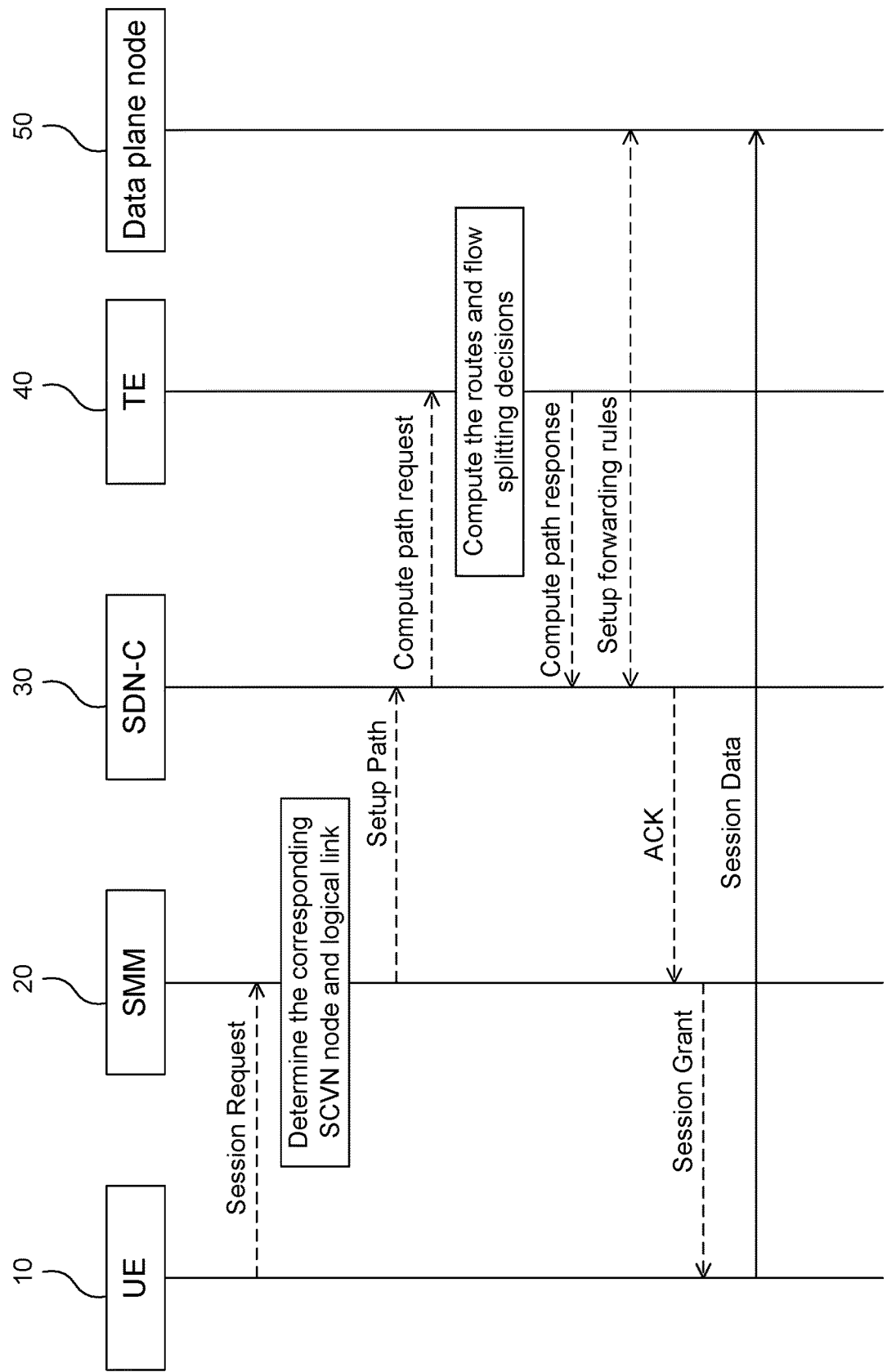
FIG. 1 schematically illustrates a signaling diagram of typical session level management procedure in SONAC.

An example signaling diagram of typical session level management is schematically illustrated in FIG. 1, according to an embodiment. The diagram includes user equipment (UE) 10 which sends a session request to the session/ mobility management (SMM) 20 function, where a corresponding service customized virtual network (SCVN) node and logical link is determined. Once the setup path is determined the software defined networking controller (SDN-C) 30 computes the path request, and a traffic engineering component (TE) 40 computes the routes and flow splitting decisions. The computed path response is sent back to the SDN-C and the setup of forwarding rules are sent to the SDN-C and the data plane node 50. The SDN-C acknowledges (ACK) the receipt of a setup of the path to the SMM, which in turn grants the session to the UE for transmission of session data.

In one embodiment, it is contemplated that a session is a semi-permanent end-to-end dialog that is required to visit multiple VF instances for state collection or maintenance. The requirement for Session-level SDT comes from the VFs and is stated in the service request as part of the VF descriptor. Session management, including mobility-oriented session management (as well as logical pathway selection) in long term evolution (LTE), is defined as session state management that is brought about by the presence of state function control (SFC). Even if all sessions are stateless, session management may still be required from an operation standpoint for, but not limited to, load balancing and complexity reduction.

According to embodiments, there is provided a system architecture and associated method that enables the interaction between the management plane (MP) and the control plane (CP) providing for SDT management at both a service level and a session level. For example, the MP can be implementing a Service-level SDT, for example using the operations support system/business support system (OSS/BSS). The CP can implement Session-level SDT using a session management function (SMF), which in some embodiments can be termed the path manager (PM). According to embodiments, the software defined protocol (SDP) functionality can be distributed into the MP and CP, for example using the OSS/BSS and the SMF.

According to embodiments, this interaction between the MP and the CP can enable the configuration of a data plane of a communication network such that service level and session level requirements are considered during configuration. For example, parameters and resources required for the configuration of the data plane can be determined based on Service-level SDT provided by a Service-level SDT component operating in the MP and Session-level SDT provided by a Session-level SDT component operating in the CP.

According to embodiments, in order to facilitate the interaction between the MP and the CP, a collection of auxiliary network functions are utilized, wherein these network functions collectively can constitute the Service-level SDT and the Session-level SDT. According to embodiments, the Service-level SDT component and Session-level SDT component can be co-located and integrated within existing MP functions and CP functions. For example, in some embodiments the Service-level SDT component can be co-located or integrated with the OSS/BSS. In some embodiments, the Session-level SDT component can be co-located or integrated with the SMF. According to some embodiments, the Service-level SDT component and Session-level SDT component can be located external to the existing MP functions and CP functions while still being accessible by these existing MP and CP functions.

According to embodiments, the Session-level SDT component can be configured to utilize real computer resources or virtual computer resources or both, in order to provide Session-level SDT functionality. In some instances the Session-level SDT component can be co-located or integrated with the SMF. It is understood that such computer resources utilize, at a hardware level, a set of one or more microprocessors operatively coupled to a corresponding set of memory components which include stored program instructions for execution by the one or more microprocessors. According to some embodiments the Session-level SDT component is configured to operate as a separate control plane function.

According to embodiments, the Service-level SDT component can be configured to utilize real computer resources or virtual computer resources or both, in order to provide Service-level SDT functionality. In some instances the Service-level SDT component can be co-located or integrated with the OSS/BSS. It is understood that such computer resources utilize, at a hardware level, a set of one or more microprocessors operatively coupled to a corresponding set of memory components which include stored program instructions for execution by the one or more microprocessors. According to some embodiments the Service-level SDT component is configured to operate as a separate management plane function.

According to embodiments, the Service-level SDT component and Session-level SDT component are configured to interact with a collection of information element (IE) functions (e.g. unified database management (UDM) function). An IE function can be configured to provide determine, monitor, evaluate, control or otherwise obtain information related to one or more of network status, network infrastructure information, service information, traffic flow information or other network parameter that may be relevant to the evaluation or provision of Service-level SDT or Session-level SDT or both.

According to embodiments, the IE functions can be static databases maintaining historical network operational information, service characteristics, session characteristics or other information that may be appropriate for the provision of Service-level SDT or Session-level SDT or both. In some embodiments the IE functions are configured to support dynamic data analytics or predictive data analytics or both for determining or evaluating network operational information, service characteristics, session characteristics or other information that may be appropriate for the provision of Service-level SDT or Session-level SDT or both. According to embodiments, these capabilities of the IE functions can include determining a state of the network in the user plane (UP) and control plane (CP) at present or future time periods or both. According to embodiments, the determining of the present or future state of the network can be evaluated in a reactively manner or a proactively manner.

Figure 2:
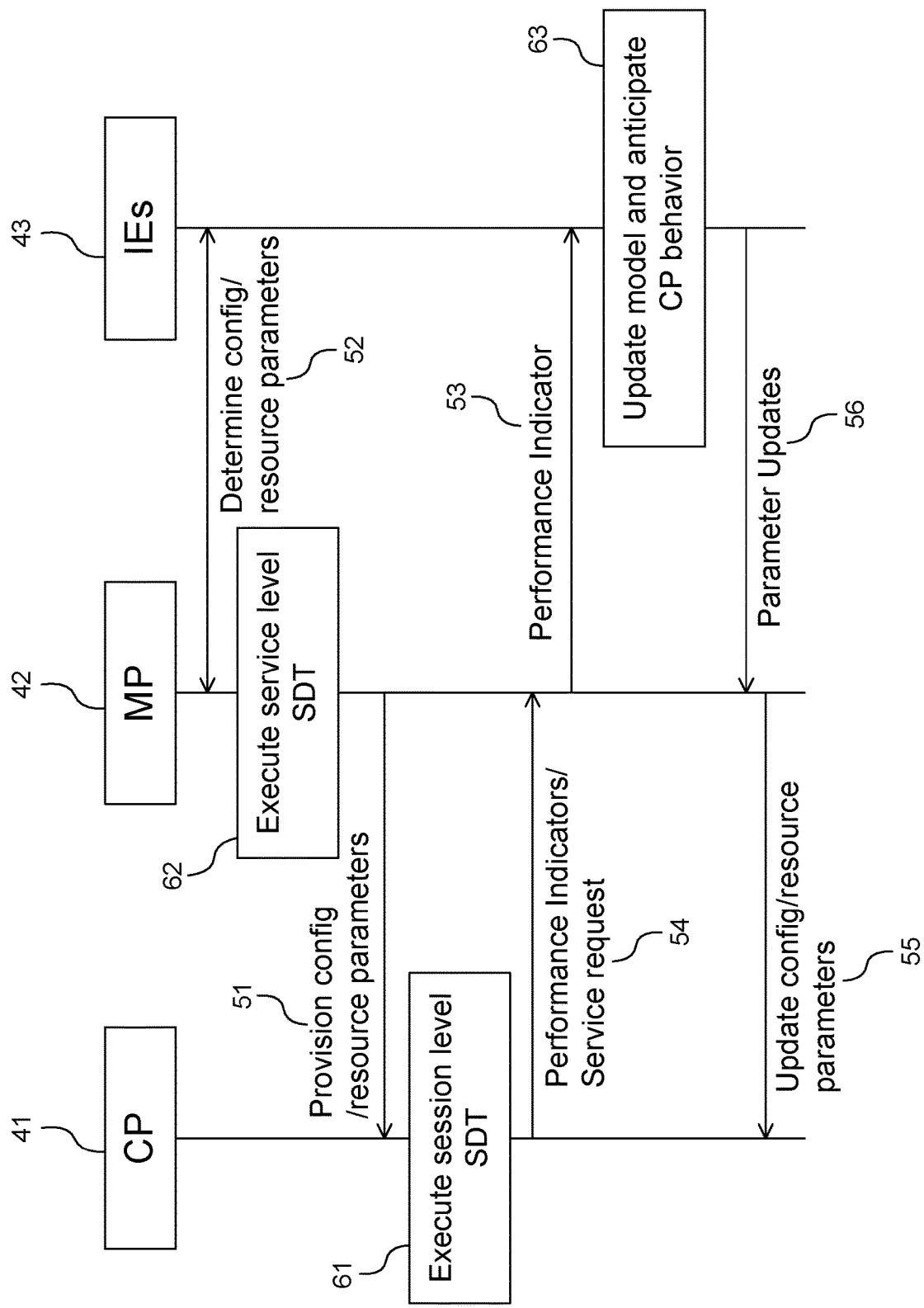
FIG. 2 schematically illustrates a signaling diagram between the management plane and the control plane in accordance with embodiments of the present invention.

FIG. 2 schematically illustrates a signaling diagram between the management plane and the control plane in accordance with embodiments of the present invention. In particular, FIG. 2 shows an example call flow illustrating MP CP interaction between Service-level SDT functions and Session-level SDT functions for determining and provisioning network configuration parameters and network resource parameters. For example, these parameters can be used for the configuring of a data plane of a communication network.

With reference to FIG. 2, the IEs 43 determine 52 configuration parameters or resource parameters or both and transmit same to the MP 42, and in particular to the Service-level SDT component operating on the MP. The MP proceeds to execute a Service-level SDT and determines a service level SDT decision based at least in part on the received configuration parameters or resource parameters or both. The MP subsequently transmits 51 configuration parameters or resource parameters or both to the CP 41, and in particular to the Session-level SDT component operating on the CP. These configuration parameters or resource parameters or both provided to the CP are subsequently used for Session-level SDT. The CP subsequently executes 61 Session-level SDT and determines a session level SDT decision based at least in part on the received configuration parameters or resource parameters or both.

According to some embodiments, one or more of the configuration parameters and resource parameters received by the MP are modified upon execution of Service-level SDT. As such the configuration parameters or resource parameters or both which are transmitted to the CP for subsequent execution of Session-level SDT, include the one or more modified configuration parameters and resource parameters.

According to some embodiments, the configuration parameters or resource parameters or both received by the MP are unmodified upon execution of Service-level SDT. As such the configuration parameters or resource parameters or both which are transmitted to the CP for subsequent execution of Session-level SDT, include the configuration parameters or resource parameters or both, which were received by the MP.

With further reference to FIG. 2, the CP transmits 54 performance indicators and service request to the MP regarding configuration of the data plane of the communication network. The performance indicators or service request or both can be determined by or based upon the Session-level SDT decision. The MP transmits 53 one or more performance indicators to the IEs 43, which can be used by the IEs to update respective one or more models relating to communication network behaviour in order to anticipate future CP behavior 63. The IEs can subsequently transmit 56 to the MP updated resource parameters or updated configuration parameters or both. The MP can subsequently transmit 55 to the CP the updated configuration parameters or updated resource parameters or both.

Figure 3:
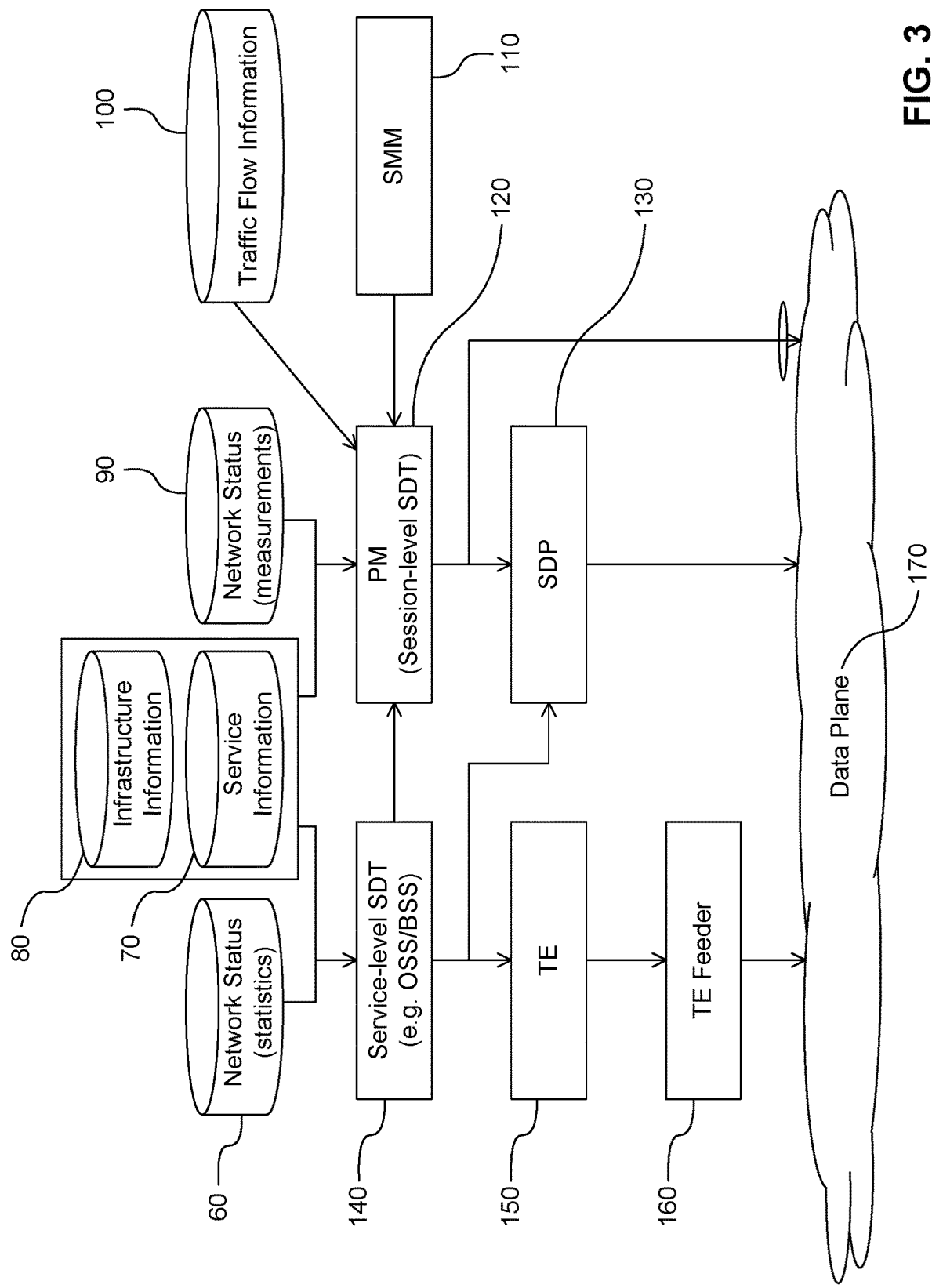
FIG. 3 schematically illustrates session management system architecture in the two-level path configuration in accordance with embodiments of the present invention.

An example of a session management system architecture in a two-level path configuration is schematically illustrated in FIG. 3, according to an embodiment. According to embodiments, Service-level SDT 140 can be provided by the OSS/BSS (i.e. operating in the MP) and Session-level SDT 120 can be provided by the session management function (SMF) (i.e. operating in the CP). In some embodiments the SMF may be termed a path manager (PM). The diagram includes infrastructure information 80 and service information 70 (including but not limited to, function statefulness information per session, and per device UE) which is divided into the network status for statistics 60 and the network status for measurements 90. Network status includes, but is not limited to data center (DCs, which can be gateway nodes, border nodes or NFV PoPs) resource availability and loading. The network status statistics are utilized by the Service-level SDT 140 to make decisions, which are passed to a path management (PM) 120 component (Session-level SDT), software defined protocol (SDP) 130 and TE 150. The TE makes a decision based on the Service-level SDT decision, which is passed to the traffic engineering feeder (TE Feeder) 160, which forwards the determined service level rules to the data plane 170. Beyond the Service-level SDT decisions, the PM also receives traffic flow information 100, and session information from the session/mobility manager (SMM) 110. In some embodiments, the SMM may be termed the mobility manager (MM) or the access and mobility management function (AMF). The PM then relays signal content, including but not limited to session identification information, logical link information and respective quality of service requirements, to the SDP and the data plane. The SDP is determined by both the Service-level SDT and the PM, and the customized protocol is relayed to the data plane for session activation.

In some embodiments, the SMM can be decomposed into a session management function (SMF) and an access and mobility management function (AMF). While the SMF and the AMF are configured as separate components, the individual function of the SMF and the AMF and the interaction the AMF and the SMF can provide the functional equivalent of the SMM. In these embodiments, the SMF is configured to manage operation of the communication network having regard session perspective, while the AMF is configured to manage operation of the communication network having regard to user equipment (UE) network access and UE mobility.

According to embodiments, the Service-level SDT is a logical function and it can be co-located or integrated into the OSS/BSS. In some embodiments, the Service-level SDT is provided by a separate network controller and in this instance the Session-level SDT is configured to interface with the Session-level SDT through the OSS/BSS.

According to embodiments, the Session-level SDT is a logical function and it can be co-located or integrated into the SMF. In other embodiments, the Session-level SDT is integrated with another control plane function or is configured as a separate control plane function.

According to embodiments, the one or more Service-level SDT decision can be provided directly to the Session-level SDT by use of a signal message. In some embodiments, the one or more Service-level SDT decisions can be provided indirectly to the Session-level SDT by via a third component which maintains the one or more Service-level SDT decisions. As an example a third component may be configured as a database. According to embodiments, the third component can be configured to provide a Service-level SDT decision using a push based approach, wherein the third component actively transmits the necessary information. In some embodiments, the third component can be configured to provide a Service-level SDT decision using a pull based approach, wherein the third component transmits the necessary information upon request by the Session-level SDT.

Figure 4:
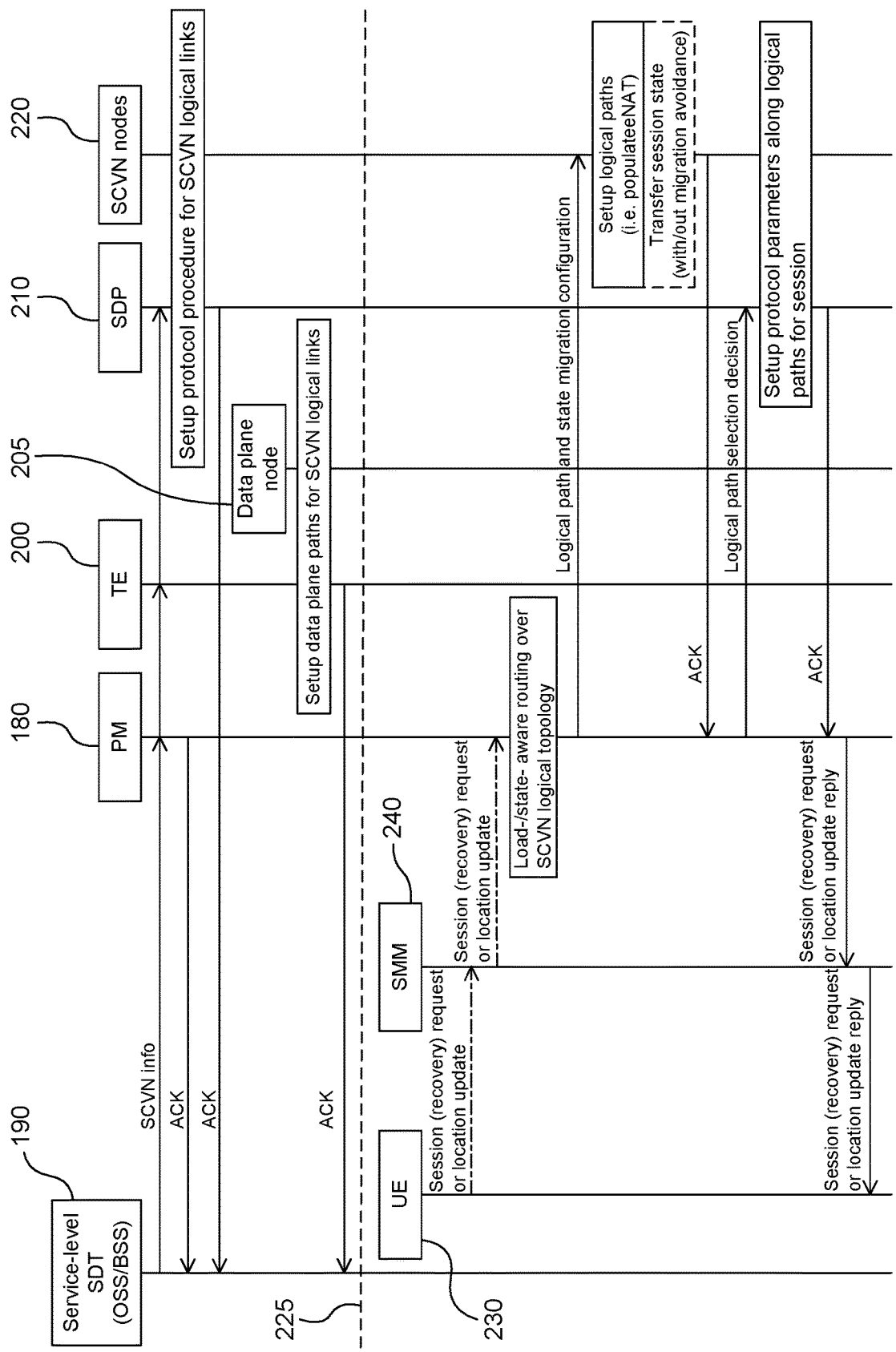
FIG. 4 illustrates a session management signaling diagram in the two-level path configuration in accordance with embodiments of the present invention.

An example of session management signaling in a two-level path configuration is illustrated in FIG. 4, according to an embodiment. The diagram includes the Service-level SDT 190 signaling as illustrated above the cross-sectional horizontal dotted line 225, and the Session-level SDT signaling as illustrated below the cross-sectional horizontal dotted line 225. The Service-level SDT passes SCVN information to a path management (PM) 180 component which performs Session-level SDT, and returns an acknowledgement to the Service-level SDT. The SCVN information is also passed along to the TE 200, which forwards onto the SDP 210 and also coordinates with the data plane node 205 to setup data plane paths for the SCVN logical links before returning an acknowledgment to the Service-level SDT. According to embodiments, the functions of the SDP which provide the setup protocol procedure for SCVN logical links may be integrated into the OSSMSS, for example it can be associated with the functionality of the Service-level SDT. The SDP takes SCVN information from the TE and then sets up the protocol procedure for the SCVN logical links, and provides it to the SCVN nodes 220. According to embodiments, the SCVN nodes may also be considered to be User Plane (UP) functions. The SDP also returns an acknowledgment to the Service-level SDT. Service-level SDT signaling will be complete at this point. Upon an optional session request, including but not limited to a session recovery request from UE 230, the SIAM 240 will relay the session request to the PM which has awareness of the load, statefulness and routing over the SCVN logical topology, and makes a logical path selection and state migration configuration decision which is passed onto the SCVN nodes. The logical pathway is then setup, and the session state may be transferred to another SCVN node if required; migration avoidance is not utilized in this session state transfer. An acknowledgment is returned to the PM, which makes a logical path selection decision and returns that decision to the SDP. Setup protocol parameters along the logical path for the session is set and provided to the SCVN nodes. According to embodiments, the functions of the SDP which provide setup protocol parameters along the logical path for the session may be integrated into the SMF or PM, for example these functions of the SDP can be associated with the functionality of the Session-level SDT. Acknowledgement is returned to the PM, which returns a session request result or location reply to the SMM, which passes on the session request result or location reply to the UE.

In some embodiments, setting up the logical pathway can including populating enhanced network address translation (ENAT), which can be an ENAT table or database to be accessed by an ENAT function. It is contemplated that the Session-level SDT will interact with ENAT at the SCVN node. ENAT acts to configure the data plane to support the Session-level SDT output to establish logical links among data centers (DCs) at the SCVN node, and to enable information packets to reach virtual function (VF) instances within a DC. DCs may include multiple nodes and functions and may have private addressing schemes. A DC may be physically located within an operator's network or in communication with the operator's network, but may or may not be run by the operator.

For example, an ENAT function can be configured to allow for communication between one or more DC gateways (within a DC Network) and one or more border nodes of an Operator's network. The DC network and the Operator's network can use different addressing schemes. However an ENAT function can allow for communication to flow despite these different addressing schemes. As an example, both the DC network and the Operator's network can include their own controller(s), which can host the NFV-C and SDN-C functions. In some embodiments, an ENAT function can be configured for each DG Gateway or Border node, however in other embodiments an ENAT function only needs to be configured for DC Gateways or the Border nodes, wherein the ENAT function provides the forwarding translations. For embodiments in which the ENAT function is to be configured at a DC gateway, the DC network controller can configure the ENAT function based on input from the NFV-C. That is, the operator's NFV-C communicates the configuration to the DC network controller, which then configures the ENAT function at the DC gateways.

Figure 5:
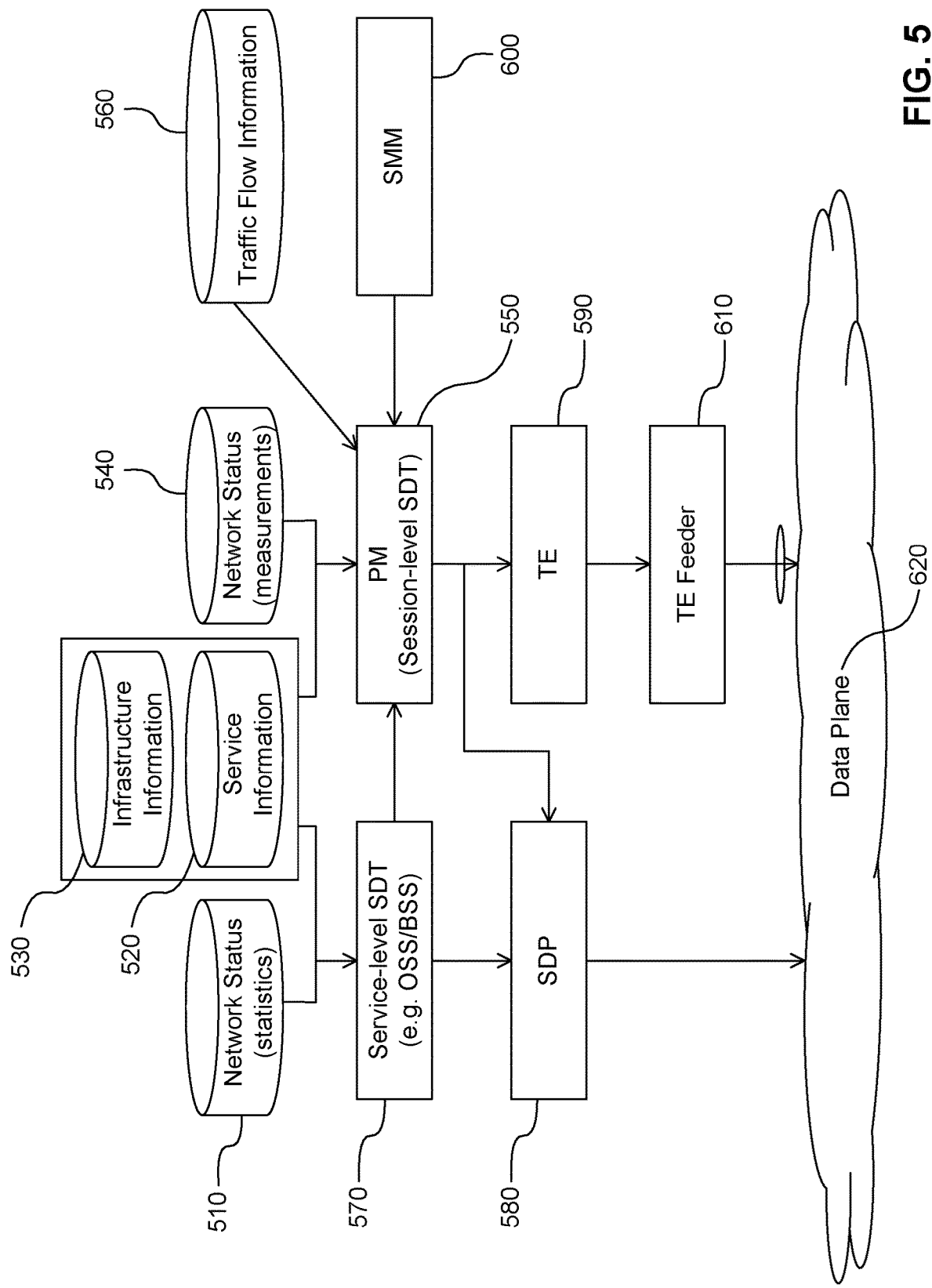
FIG. 5 schematically illustrates session management system architecture in the one-level path configuration in accordance with embodiments of the present invention.

An example of session management system architecture in a one-level path configuration is schematically illustrated in FIG. 5, according to an embodiment. According to embodiments, Service-level SDT 570 can be provided by the OSS/BSS (i.e. operating in the MP) and Session-level SDT 550 can be provided by the session management function (SMF) (i.e. operating in the CP). In some embodiments the SMF may be termed a path manager (PM). The diagram includes infrastructure information 530 and service information 520 (including but not limited to, function statefulness information per session, and per UE) which is divided into the network status 510 for statistics and the network status 540 for measurements. Network status includes, but is not limited to DC resource availability and loading. The network status statistics are utilized by the Service-level SDT 570 to make decisions, which are passed to the PM 550, and SDP 580. The SDP (after also receiving a Session-level SDT decision from the PM) then passes protocol customization directly to the data plane 620. Beyond the Service-level SDT decisions, the PM also receives traffic flow information 560, and session requests from the SMM 600. In some embodiments, the SSM may be termed the mobility manager (MM) or the access and mobility management function (AMF). The PM then relays signal content, including but not limited to session identification information, logical link information and respective quality of service requirements, to the SDP and the and TE 590. The TE makes a decision based on the Service-level SDT decision, which is passed to the TE Feeder 610. The TE Feeder then forwards the determined service level rules to the data plane. In this one-level path configuration, each time the session is updated, the TE re-establishes each SCVN node within the session level.

According to embodiments, the Service-level SDT is a logical function and it can be co-located or integrated into the OSS/BSS. In some embodiments, the Service-level SDT is provided by a separate network controller and in this instance the Session-level SDT is configured to interface with the Session-level SDT through the OSS/BSS.

According to embodiments, the Session-level SDT is a logical function and it can be co-located or integrated into the SMF. In other embodiments, the Session-level SDT is integrated with another control plane function or is configured as a separate control plane function.

According to embodiments, the one or more Service-level SDT decision can be provided directly to the Session-level SDT by use of a signal message. In some embodiments, the one or more Service-level SDT decisions can be provided indirectly to the Session-level SDT by via a third component which maintains the one or more Service-level SDT decisions. As an example a third component may be configured as a database. According to embodiments, the third component can be configured to provide a Service-level SDT decision using a push based approach, wherein the third component actively transmits the necessary information. In some embodiments, the third component can be configured to provide a Service-level SDT decision using a pull based approach, wherein the third component transmits the necessary information upon request by the Session-level SDT.

According to embodiments, the control plane function that is configured to implement the Session-level SDT, for example the session management function (SMF) or the path manager (PM) or other control plane function, has a direct interface with the traffic engineering (TE) component. In other embodiments, the control plane function that is configured to implement the Session-level SDT is configured to interact with the TE component through the service capability exposure function (SCEF).

Figure 6:
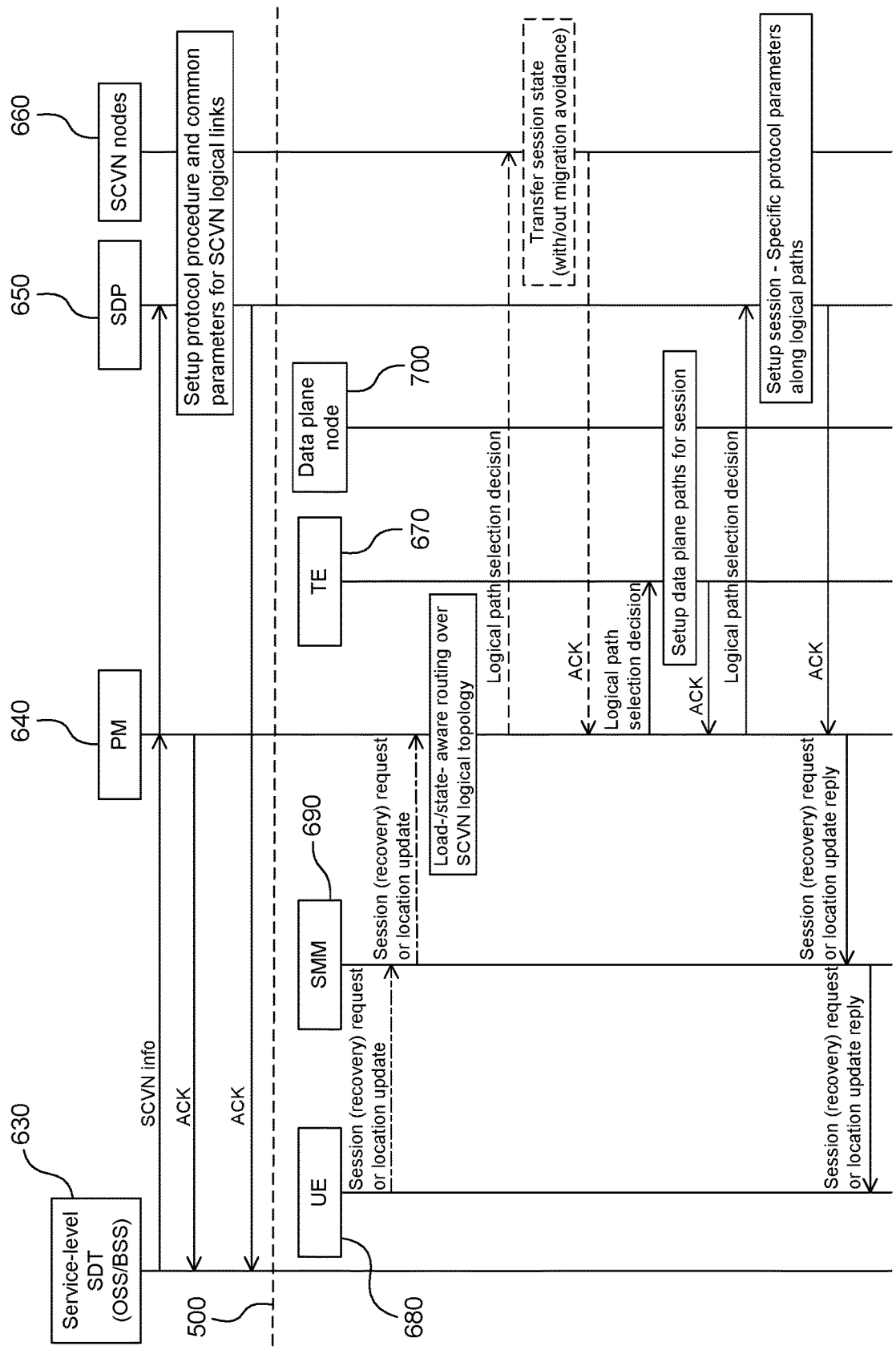
FIG. 6 illustrates a session management signaling diagram in the one-level path configuration in accordance with embodiments of the present invention.

An example of session management signaling in a one-level path configuration is illustrated in FIG. 6, according to an embodiment. The diagram includes the Service-level SDT signaling as illustrated above the cross-sectional horizontal dotted line 500, and the Session-level SDT signaling as illustrated below the cross-sectional horizontal dotted line 500. The Service-level SDT 630 passes SCVN information to the PM 640, which performs Session-level SDT, and returns an acknowledgment to the Service-level SDT. The SCVN information is also passed along to the SDP 650, which takes SCVN information and setup the protocol procedure and common parameters for the SCVN logical links, and provides this information to the SCVN nodes 660. According to embodiments, the functions of the SDP which provide the setup protocol procedure and common parameters for SCVN logical links may be integrated into the OSS/BSS, for example these functions of the SDP can be associated with the functionality of the Service-level SDT. The SDP also returns an acknowledgment to the Service-level SDT. Service-level SDT signaling will be complete at this point. Upon an optional session request or location update, including but not limited to a session recovery request from UE 680, the SMM 690 will relay the session request or location update to the PM which has awareness of the load, statefulness and routing over the SCVN logical topology. The PM may make a logical path selection which is passed onto the SCVN nodes. According to embodiments, the SCVN nodes may also be considered to be user plane (UP) functions. The SCVN node may transfer the session state (with or without migration avoidance) and return an acknowledgment to the PM. The PM then makes a logical pathway selection and sends that selection to the TE 670. The TE then sets up the data plane paths for the data plane node 700, and returns an acknowledgment to the PM. The PM then makes another logical path selection which is passed to the SDP, where session-specific protocol parameters along logical paths are setup and passed onto the SCVN node. According to embodiments, the functions of the SDP which provide setup protocol parameters along the logical path for the session may be integrated into the SMF or PM, for example it can be associated with the functionality of the Session-level SDT. The SDP returns an acknowledgement to the PM, which in turn returns the session request result or location update to the SMM, and onto the UE.

According to embodiments, the session management system architecture can be configured as a hybrid of the above options, namely a combination of the one level path architecture and the two level path architecture. In this embodiment, the session management system architecture is configured to follow a two level path architecture as discussed above with respect to FIG. 3 with signaling therefore discussed with respect to FIG. 4. However, for special session requests, the session management system architecture can be configured to switch to a one level path architecture as discussed above with respect to FIG. 5 with signaling therefore discussed with respect to FIG. 6

According to embodiments, a special session can be defined as a session that is differentiated from other sessions in that a special session requires a guaranteed level of network performance. As can be seen in FIG. 5, which illustrates a one level path architecture, the Session-level SDT component, for example the SMF or the PM, interacts with the TE component thereby providing the Session-level SDT component with direct interaction with the TE component for the provision of the guaranteed level of network performance required by the special session request.

According to embodiments, a special session may be a session that upon provision of the resources therefore, can cause the logical network or a portion thereof to be over loaded. For example, an over loaded condition can be considered when a logical link becomes congested due to the special session. Congestion may be estimated according to a session's quality of service requirement and the capacity of logical link. Congestion may also be estimated based on a quality of service property or a performance property. According to embodiments, the TE component can resolve the potential congestion in instances when the congestion is considered to be a temporary issue. In some embodiments, if the congestion continues to be a persistent issue, the traffic engineering component can notify the Session-level SDT component to subsequently request or advise the Service-level SDT component that a revision of the Service-level SDT decision may require revision or adjustment.

In one embodiment, it is contemplated that the Session-level SDT decision will have a defined lifecycle. The decision regarding a stateful function, for example the Session-level SDT function remaining in an active state, may remain effective until the session terminates. Such a session normally corresponds to a data transaction in the application layer. Hence, the Session-level SDT decision related to PoPs normally remain static when all the virtual network functions (VNFs) are stateful unless the Service-level SDT decision is changed, or some PoP is extremely overloaded (causing unacceptable performance drop at the application layer). The decision regarding a stateless function may change as necessary before the session terminates. This will depend on the loading of the PoPs of the function. As long as the stateless function is involved, the Session-level SDT decision related to PoPs may be changed.

In another embodiment, it is contemplated that ENAT is extended to perform session level translation and in some instances can be termed as extended ENAT. Such translation will support non-address based forwarding at the session level and consequently establish logical links between VFs at the session level. For an outgoing DC packet, the information map (comprising the DC internal address and the session ID) will pair to the outgoing logical link. For an incoming DC packet, the information map will connect the incoming logical link to the DC-internal address. In this embodiment, the ENAT performs service level translation as a special case of session level translation where the session ID is equal to the service ID; the service ID and local session ID are configured together so both the service ID and session ID can be understood.

According to one embodiment, FIG. 17 below illustrates tables for packet information organization for the extended ENAT at a DC. In particular, FIG. 17 outlines the extended enhanced network address translation at data center address-based forwarding, and non-address-based forwarding in accordance with embodiments of the present invention. Within these packets, a logical link may be expressed as a pair, including network ID and local logical links address. The type of cast expressed within the packet is optional if multi-casting, any-casting, or broadcasting addresses are allocated. Incoming address-based forwarding packets may include destination address, DC-internal address(es) and the type of cast. Outgoing address-based forwarding packets may include session ID and source address, destination address(es), and the type of cast. Incoming traffic of non-address-based forwarding packets may include logical link (LL), DC-internal address(es), and the type of cast. Outgoing traffic of non-address-based forwarding packets may include session ID and source network address, LLs, and the type of cast.

In one embodiment, it is contemplated that the extended ENAT will interact with Session-level SDT for migration avoidance purposes. When the existing VNFs become overloaded by traffic load or the processing requirements of the VNFs associated with the traffic load increases, more VNFs may be instantiated to split or spread the load over a larger number of VNF instances. This may be considered a migration avoidance method and is often referred to as scaling out. When number of VNF instances is reduced for the purpose of contraction during underutilization thereof, migration avoidance methods are also utilized; this can be referred to as scaling in. In order to achieve migration avoidance, all processing switches or at least some processing switches (both hardware and software) can act in concert in order to ensure that a flow is directed to the VNF instance that maintains the state needed to process that flow; this can be referred to as dynamic scaling. For a dynamic scaling instance such as scaling out, an overload detector detects when a VNF instance is overloaded and then notifies the system wide controller. Placement decisions, which determine where (e.g. which server cores or within which server) new VNF instances should be placed can be initiated. Then there is creation of new VNF instances (implemented as any of processes, containers, or VMs) at specified cores as determined by the placement component. The remaining step for dynamic scaling is to configure the network to direct traffic to the appropriate VNF instances. In some embodiments, migration avoidance may only be applied at stateful VNFs, and most VNFs are stateful (i.e. processing a particular packed depends on state established by the arrival of previous packets in that flow or aggregate of flows). Therefore VNFs require affinity, where traffic for a given flow or aggregate of flows has to reach the instance of the VNF that has access to that flow's state. For example, if there are multiple instances of NAT VNF, then a packet should be sent to the NAT instance that maintains the address mapping for the flow associated with the packet (or with the NAT instance maintaining the address mapping for the packet itself). This technique only requires that the flow ID can be computed based on information available at the switch, such as the packet's header fields. When a VNF instance is replicated, its input traffic will be split in a manner that preserves the VNF's affinity requirement.

In one embodiment, it is contemplated that the extended ENAT can be used as a virtual switch in the migration avoidance technique for redirecting new flows arriving at the old VNF instance, to new VNF instances for processing. The paths for flow re-direction may be provisioned by TE dynamically, or in a preconfigured manner while old flows continue to be processed at the old VNF. As old flows diminish to some degree, the forwarding rules for the remaining old flows can be reconfigured and the respective state migration can be performed. When the extended ENAT is used for migration avoidance as described, there is benefit in the savings related to state migration as well as the savings of forwarding rule configuration. The virtual switch is lower cost in comparison to sending packet flow to a completely new node. This can be useful in the session management architecture in a one-level path configuration, where TE is carried out on a per-session or per-flow level.

According to one embodiment, FIG. 18 below illustrates tables for packet information organization for the extended ENAT at DC with migration avoidance rules. In particular, FIG. 18 outlines the extended enhanced network address translation at data center address-based forwarding, and non-address-based forwarding in accordance with embodiments of the present invention. Within these packets, a logical link for flow redirection may have a globally unique ID. Incoming address-based packets with migration avoidance rules may include destination and session ID (including flow ID), and new destination information. Incoming non-address-based packets with migration avoidance rules may include LL and session ID (including flow ID), and a new LL.

According to one embodiment, FIG. 19 illustrates benefits of a Session-level SDT component in the control plane to handle individual session recovery requests in real time. FIG. 19 also illustrates differences in TE problem complexity, operation and signaling overhead when comparing two-level path configuration and one-level path configuration. In theoretical terms, the one-level path configuration, although of higher complexity and requiring higher TE operation and signaling overhead, may be able to better optimize the decision made in the logical path selection.

In one embodiment it is contemplated that the Session-level SDT can be avoided by enforcing a tree-based logical topology (singular hierarchy pathway for decision making, instead of a mesh-based multiple pathway decision making topology) in the Service-level SDT decision making. Imposing a tree-based logical topology may come at the cost of higher complexity and performance as the Service-level SDT becomes complicated due to additional binary variables associated with the PoPs. The system performance may drop due to inefficient use of network resources, as a large amount of traffic concentrates on a single PoP while multiple PoPs are desired for load balancing over links and DCs.

In another embodiment, it is contemplated that the Session-level SDT may be detected in different ways depending on the configuration. In the two-level path configuration the data plane routers receive logical-link-based forwarding rules (at the physical node level) and the SCVN node receives session-based internal node level forwarding rules. In the one-level path configuration the data plane routers receive session-based forwarding rules.

Figure 7:
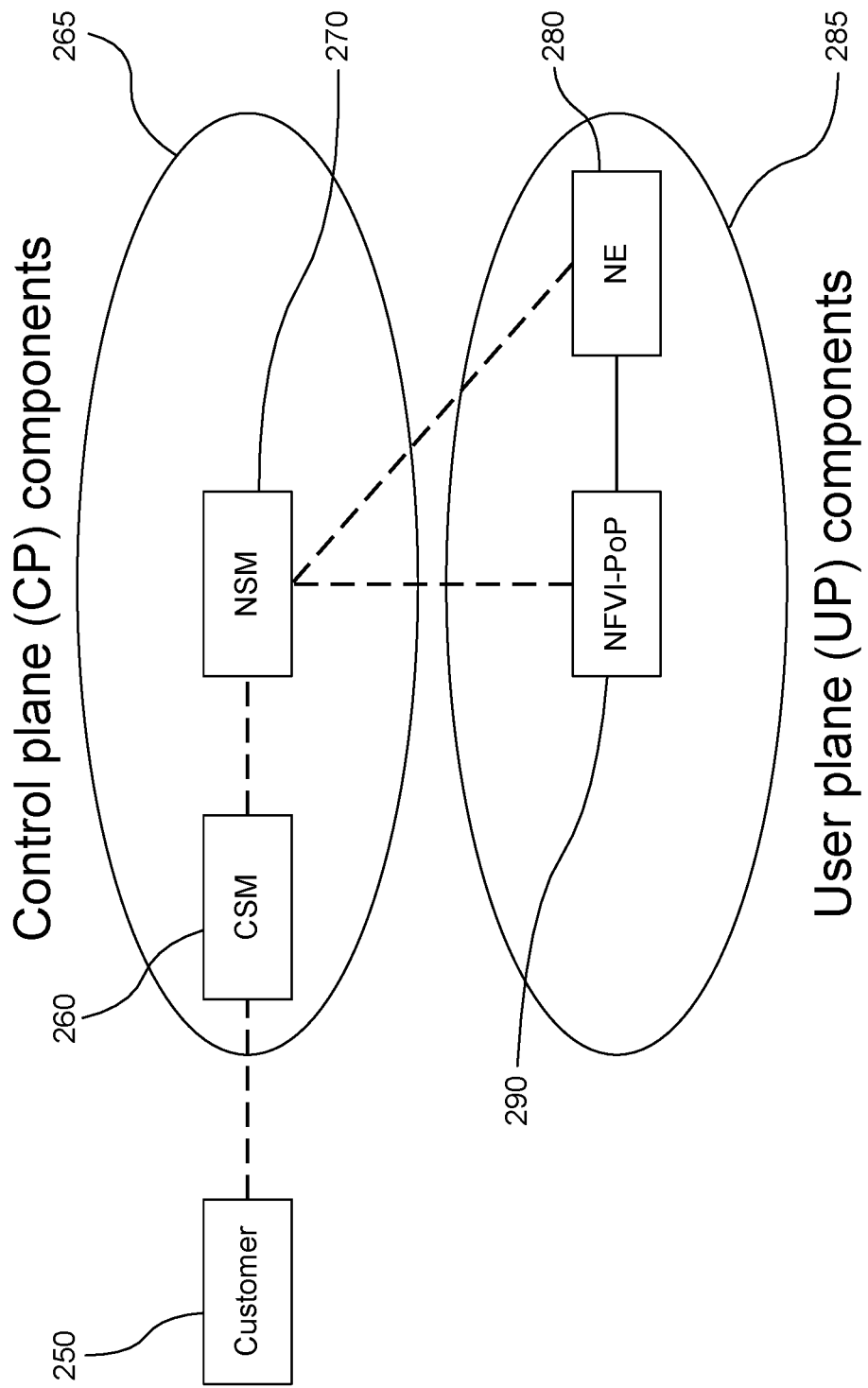
FIG. 7 schematically illustrates the architecture support for network slicing.

An example of a schematic illustration of the architecture support for network slicing is illustrated in FIG. 7, according to an embodiment. Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers") is a collection of logical network functions that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition. The schematic does not include the SDP, TE and TE Feeder components. The customer 250, may optionally connect to customer service manager (CSM) 260, which in turn may connect with the network slice manager (NSM) 270; the NSM functions at the service level. Both of the CSM and the NSM are control plane (CP) 265 components. The NSM may then optionally connect with both the network function virtualization infrastructure point of presence (NFVI-PoP) 290 and a network element (NE) 280. The NE and NFVI-PoP are connected and both considered user plane (UP) 285 components.

Figure 8:
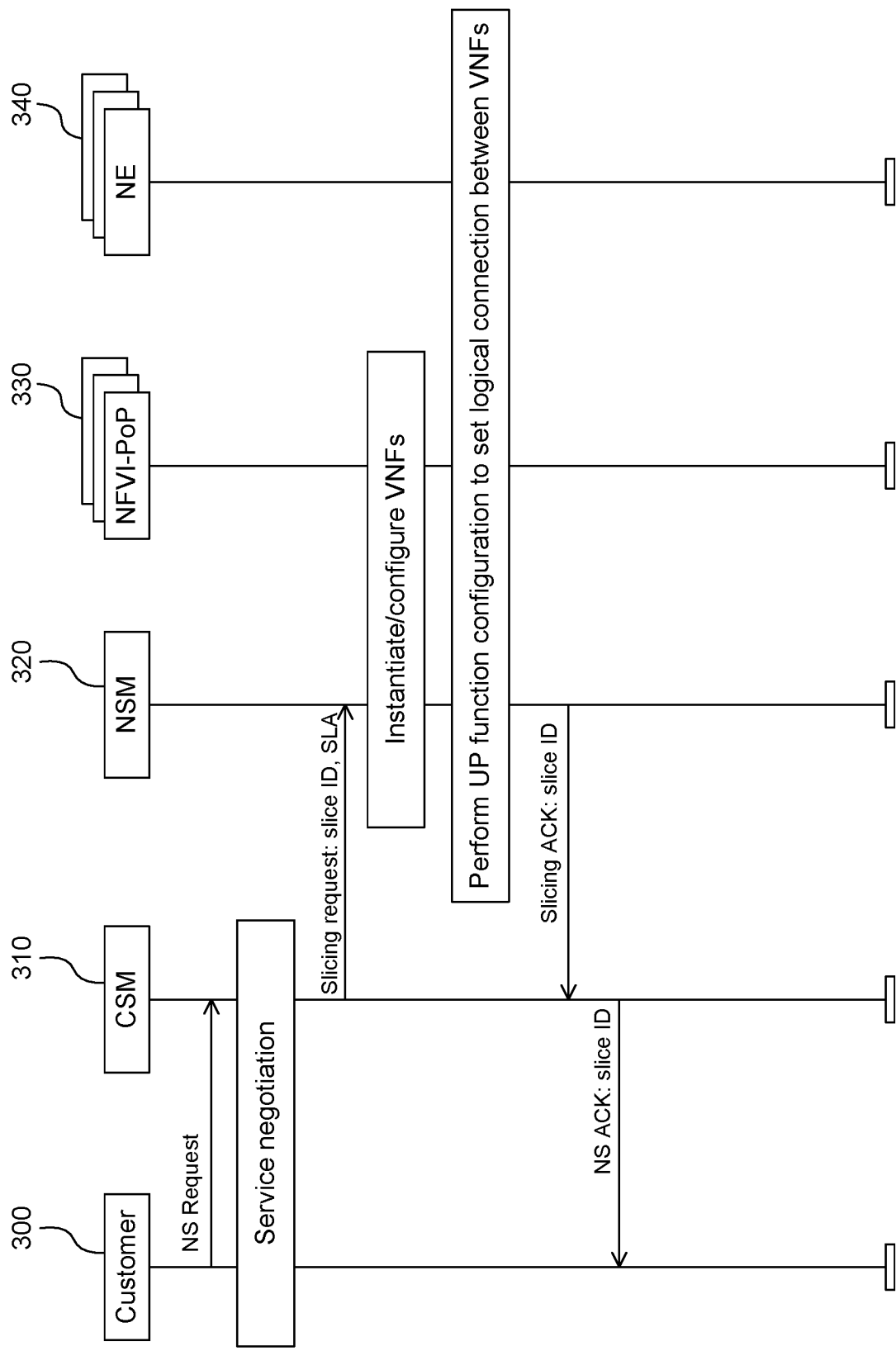
FIG. 8 illustrates a slice composition procedure signaling diagram in accordance with embodiments of the present invention.

An example of the composition procedure for network slicing is illustrated in the signaling diagram FIG. 8, according to an embodiment. This diagram includes a new service (NS) request from a customer 300 to a CSM 310. Service negotiation is competed between the customer and the CSM before a slicing request (which includes provision of a slice ID and service level agreement (SLA)) is sent to the NSM 320. The NSM then initiates and configures the VNFs with the NFVI-PoP 330, before performing user plane function configuration to set logical connections between the NSM, NFVI-PoP and NE 340. The NSM then sends the slicing request result acknowledgement (including the slice ID) to the CSM, which in turn sends the NS result acknowledgement (which also includes the slice ID) to the customer. In this way, service level network slicing may be performed.)

Figure 9:
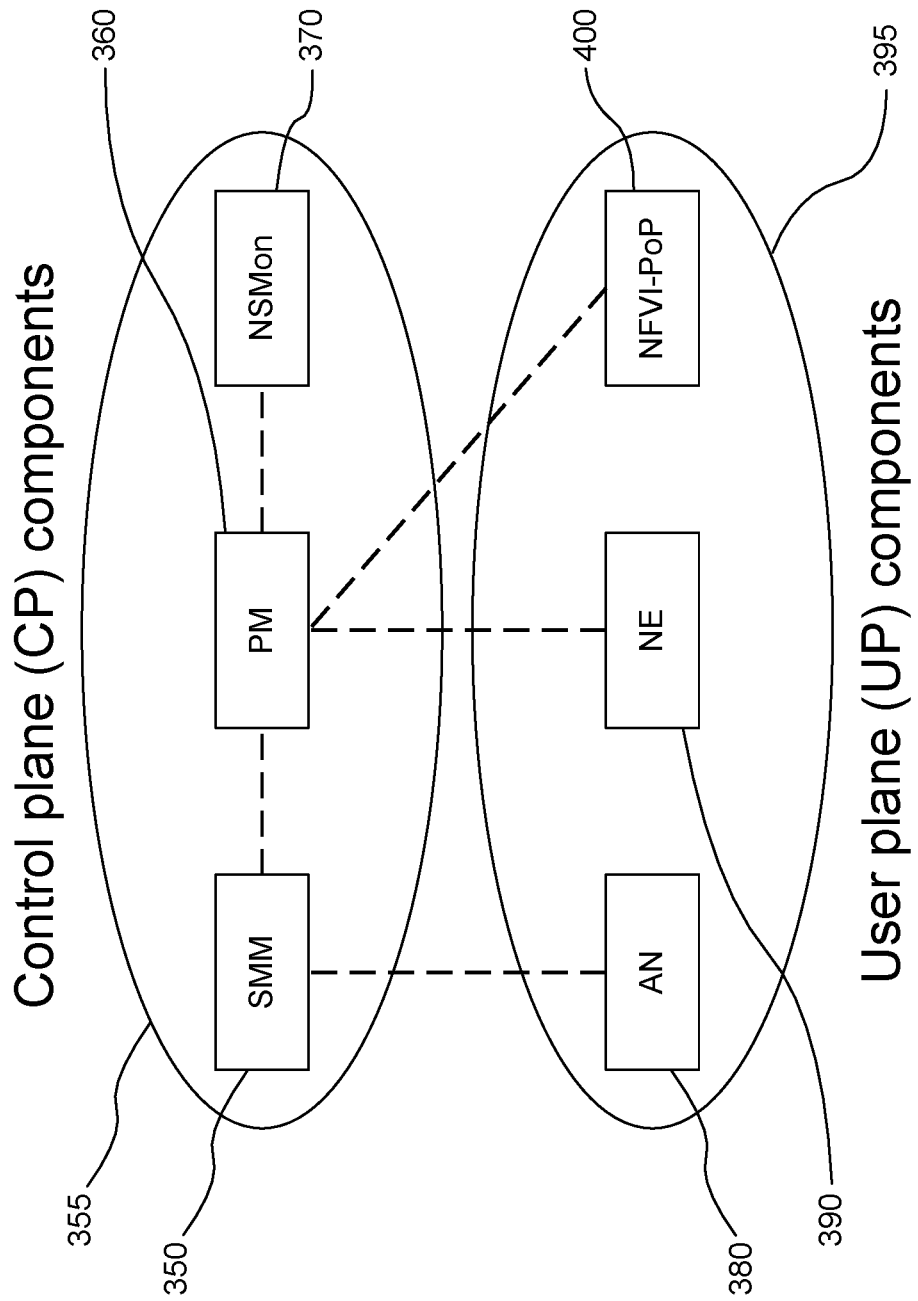
FIG. 9 schematically illustrates the architecture support for session management in accordance with embodiments of the present invention.

An example of a schematic illustration of the architecture support for session management is illustrated in FIG. 9, according to an embodiment. This illustration includes some CP 355 components, including the session/mobility manager (SMM) 350, path management (PM) 360, and the network slice monitor (NSMon) 370. The SMM may connect to the PM, while it also may connect with an access node (AN) 380. The NSMon may also connect with the PM. The PM may also communicate with the network element (NE) 390 and the network function virtualizations infrastructure point of presence (NVFI-PoP) 390. The AN, NE and NFVI-PoP are user plane (UP) 395 components.

Figure 10:
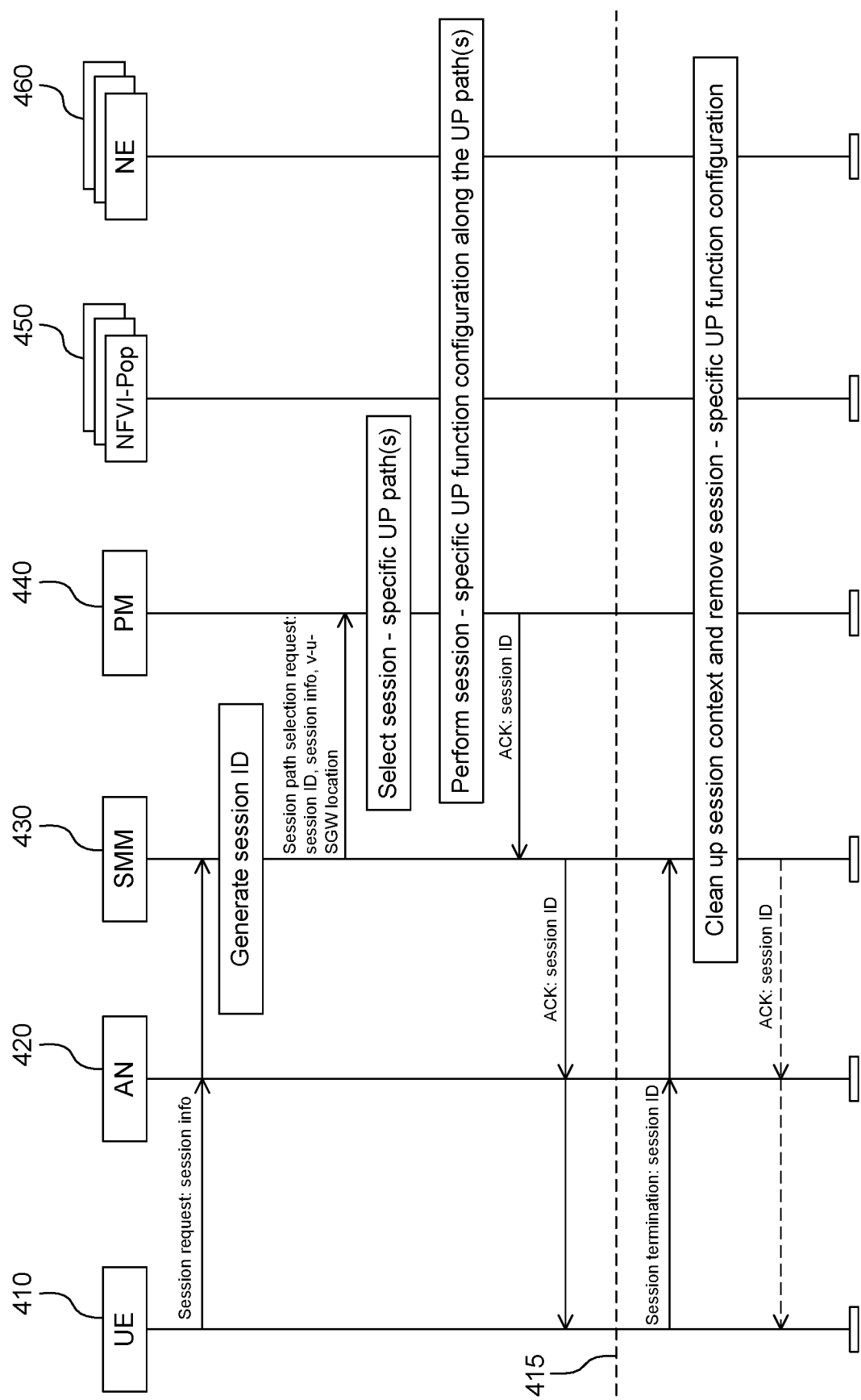
FIG. 10 illustrates a session establishment and teardown signaling diagram in accordance with embodiments of the present invention.

An example of session establishment and teardown is illustrated in the signaling diagram FIG. 10, according to an embodiment. Session establishment is illustrated above the cross-sectional horizontal dotted line 415, and session teardown is illustrated below the cross-sectional horizontal dotted line. The user equipment (UE) 410 sends a session request (which includes session information) to an access node (AN) 420. The AN then sends the session request to the session/mobility manager (SMM) 430, which generates a session ID and sends a session path selection request (which includes the provision of session ID, session information, and virtual-user-service gateway (v-u-SGW) location) to the path management (PM) 440. The PM then selects the session specific user plane (UP) paths and performs session specific UP function configuration along the UP paths at the network function virtualizations infrastructure point of presence (NFVI-PoP) 450 and network element (NE) 460. The PM then returns acknowledgement (including the session ID) to the SMM, which in turn returns acknowledgement to the AN and the UE. When the session teardown occurs, session termination request (including session ID) is sent from the UE to the AN, and onto the SMM. The SMM cleans up the session context and removes the session specific UP function configuration across the PM, NFVI-PoP and NE. The SMM then may return acknowledgment (including the session ID) to the AN and onto the UE.

Figure 11:
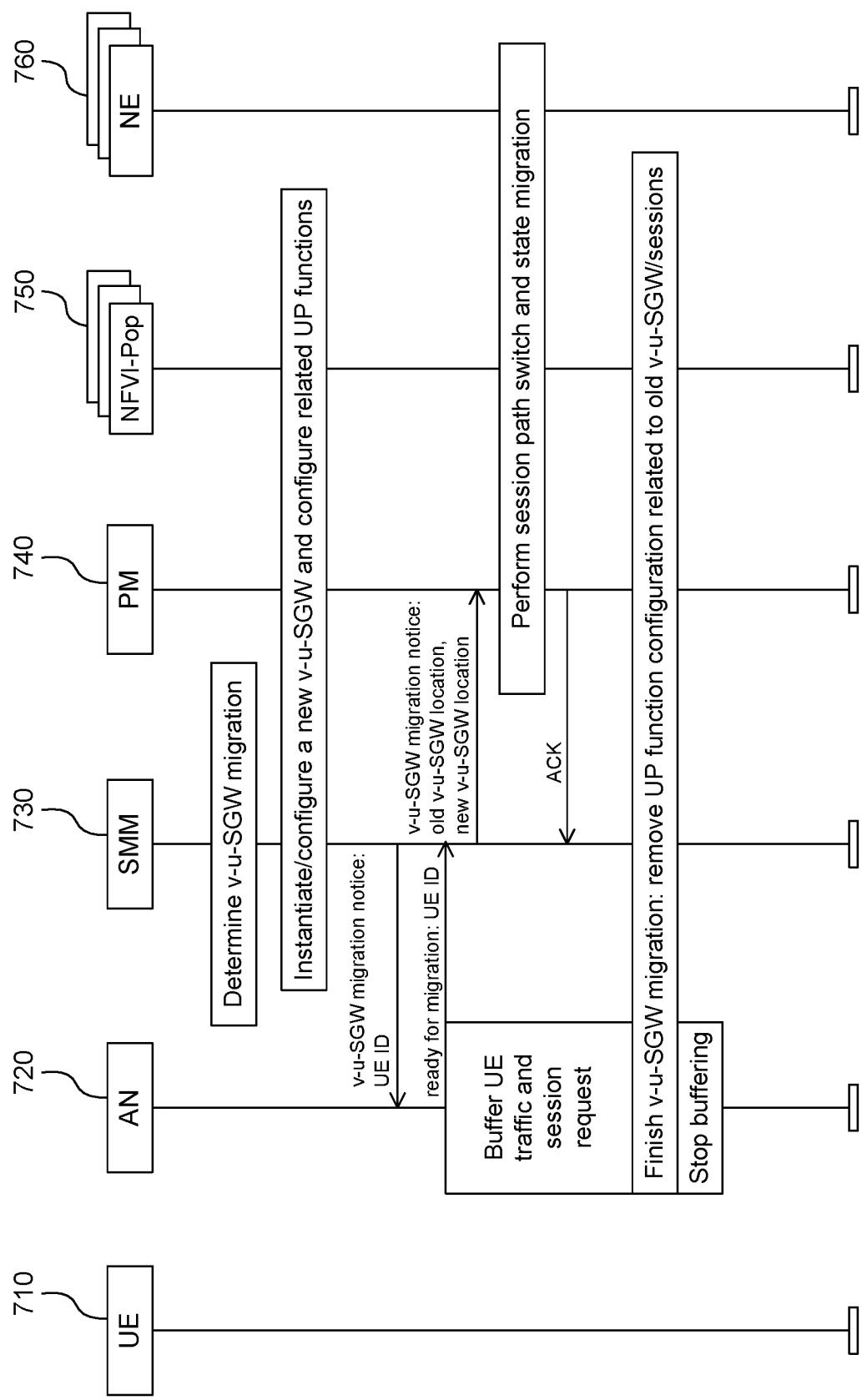
FIG. 11 illustrates a session management with v-u-SGW migration signaling diagram in accordance with embodiments of the present invention.

An example of session management with v-u-SGW migration is illustrated in the signaling diagram FIG. 11, according to an embodiment. Initially, the SMM 730 determines the v-u-SGW migration and initiates or configures a new v-u-SGW and configures related UP functions across the PM 740 and NFVI-PoP 750. The SMM then sends a v-u-SGW migration notice (including a UE ID) to the AN 720, which when ready for migration, will return the migration notice to the SMM. From the SMM, the v-u-SGW migration notice (which includes the old v-u-SGW location, and the new v-u-SGW location) is passed onto the PM. The PM performs a session path switch and state migration across the NFVI-PoP and the NE 760, before returning acknowledgment to the SMM. As the migration notice moves through the SMM, PM, NFVI-PoP and NE, the AN will buffer UE 710 traffic and the session request. The AN will then finish v-u-SGW migration by removing the UP function configuration related to old v-u-SGW and session across the SMM, PM and NFVI-PoP, before the AN stops buffering.

Figure 12:
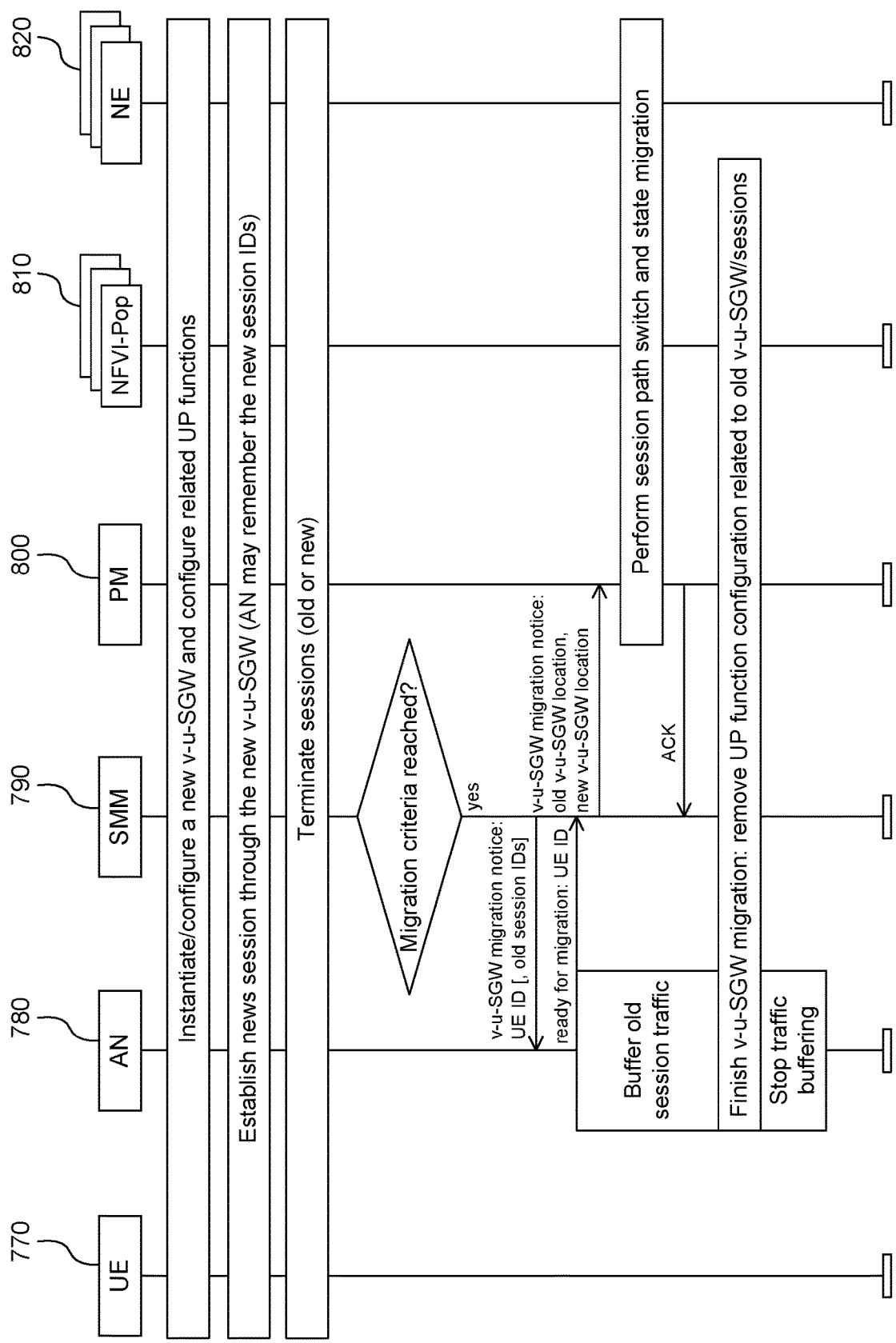
FIG. 12 illustrates a session management with v-u-SGW migration avoidance signaling diagram in accordance with embodiments of the present invention.

An example of session management with v-u-SGW migration avoidance is illustrated in the signaling diagram FIG. 12, according to an embodiment. There is initiation and configuration of a new v-u-SGW, and a configuration of related UP functions across the UE 770, AN 780, SMM 790, PM 800, NFVI-PoP 810, and NE 820. Next, a new session is established through the new v-u-SGW (the AN may remember the new session ID) across the UE, AN, SMM, PM, NFVI-PoP, and NE. Then the old or new session is terminated across the UE, AN, SMM, PM, NFVI-PoP, and NE. The SMM then decides if the migration criteria have been reached. If it is decided so, the v-u-SGW migration notice (including the UE ID and old session IDs) is sent to the AN. When ready for migration, the AN will return the migration notice to the SMM. From the SMM the v-u-SGW migration notice (which includes the old v-u-SGW location, and the new v-u-SGW location) is passed onto the PM. The PM performs a session path switch and state migration across the NFVI-PoP and the NE, before returning acknowledgement to the SMM. As the migration notice moves through the SMM, PM, NFVI-PoP and NE, the AN will buffer UE traffic and the session request. The AN will then finish v-u-SGW migration by removing the UP function configuration related to old v-u-SGW and session across the SMM, PM and NFVI-PoP, before the AN stops buffering.

Figure 13:
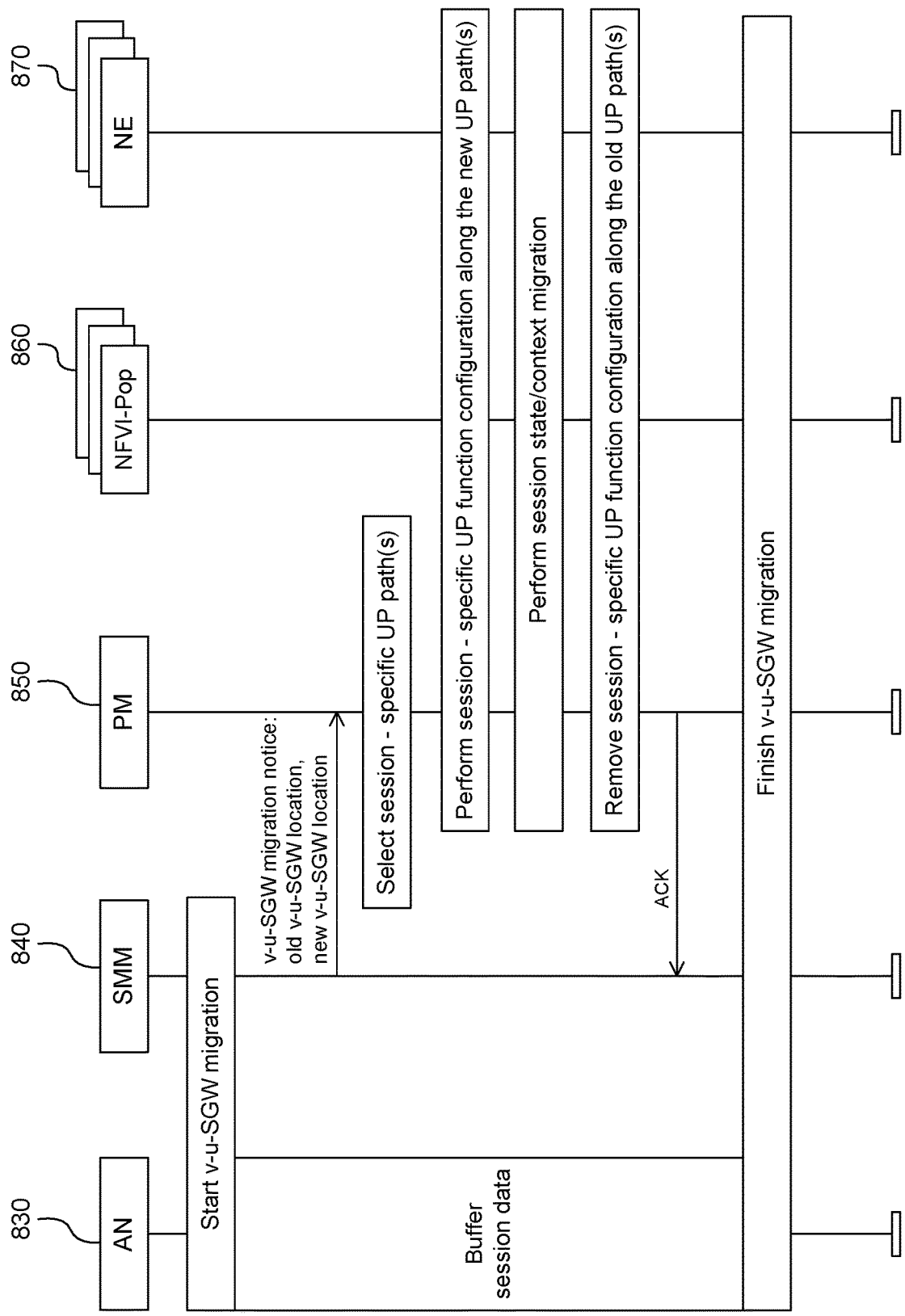
FIG. 13 illustrates a session path switch due to v-u-SGW migration signaling diagram in accordance with embodiments of the present invention.

An example of session path switching due to v-u-SGW migration is illustrated in the signaling diagram FIG. 13, according to an embodiment. Once the AN 830 initiates the v-u-SGW migration with the SMM 840, it will buffer the session data while the migration takes place through other components. The SMM will send a v-u-SGW migration notice (which includes the old v-u-SGW location, and the new v-u-SGW location information) onto the PM 850. The PM will then select the session-specific UP paths, and perform session-specific UP function configuration with the NFVI-PoP 860 and NE 870 along the new UP paths. Next, session state or session context migration is performed by the PM, NFVI-PoP, and NE, which also remove the session-specific UP function configuration along the old UP paths. Once this is complete the PM returns acknowledgement to the SMM, and the AN stops buffering the session data to finish the v-u-SGW migration across the AN, SMM, PM, NFVI-PoP, and the NE.

Figure 14:
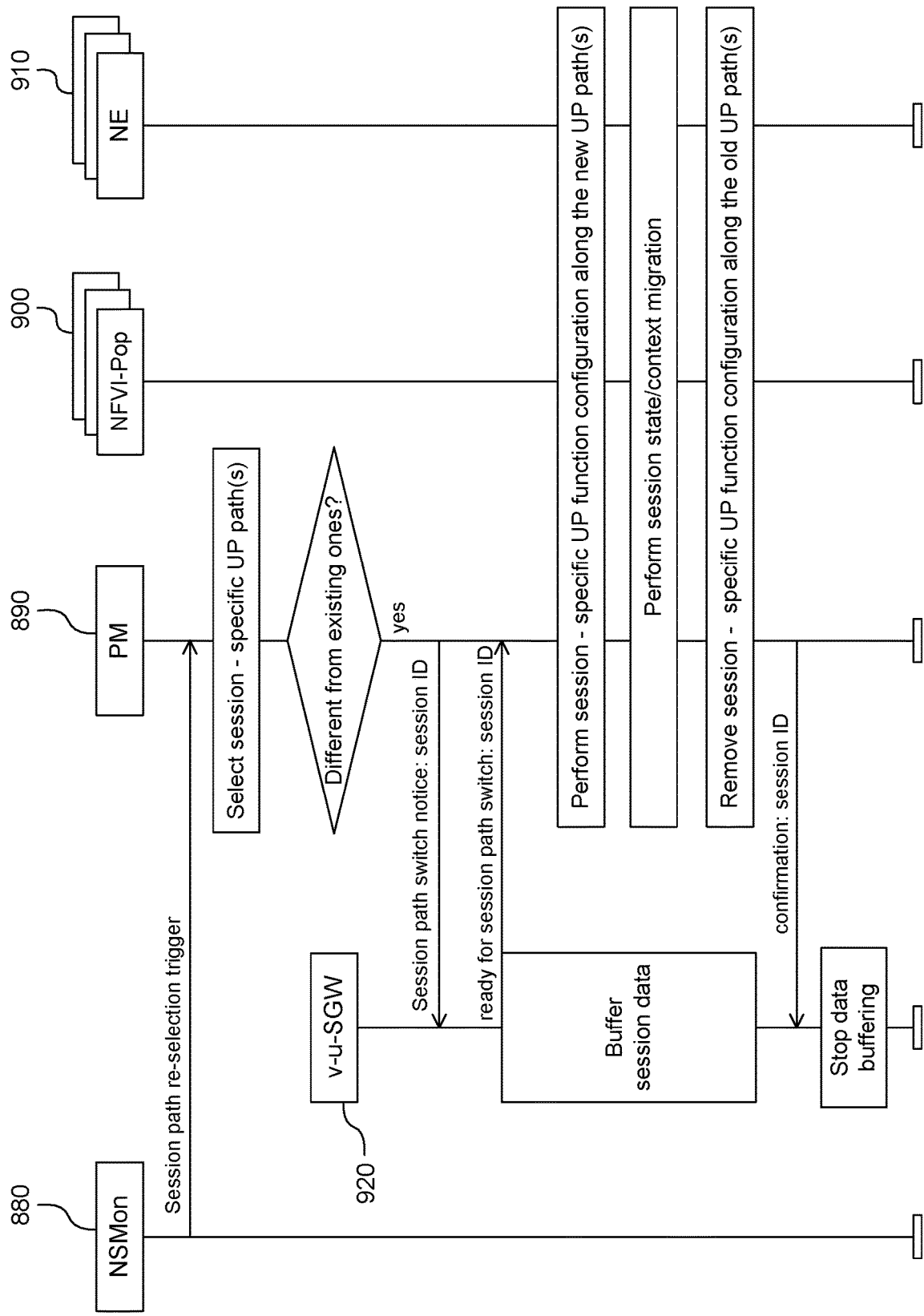
FIG. 14 illustrates a session path switch due to loading signaling diagram in accordance with embodiments of the present invention.

An example of session path switching due to loading is illustrated in the signaling diagram FIG. 14, according to an embodiment. A session path reselection trigger is sent from the new session monitor (NSMon) 880) to the PM 890. The PM then selects session-specific UP paths and determines if these paths are different from the existing paths. If the paths are different, the PM sends a session path switch notice (which includes a session ID) to the v-u-SGW 920. The v-u-SGW returns that a session path switch is ready (including the session ID) to the PM, and begins to buffer the session data while the session path switch request is processed through the PM, NFVI-PoP 900, and NE 910. The PM will then perform session-specific UP function configuration along the new UP paths with the NFVI-PoP and NE, before performing the session state or configuration migration across the same components. Next, the session-specific UP function configuration along the old UP paths is removed along the PM, NFVI-PoP, and NE, before the PM returns confirmation (including the session ID) to the v-u-SGW. At this point the v-u-SGW stops data buffering, and the session path switch due to loading is complete.

Figure 15:
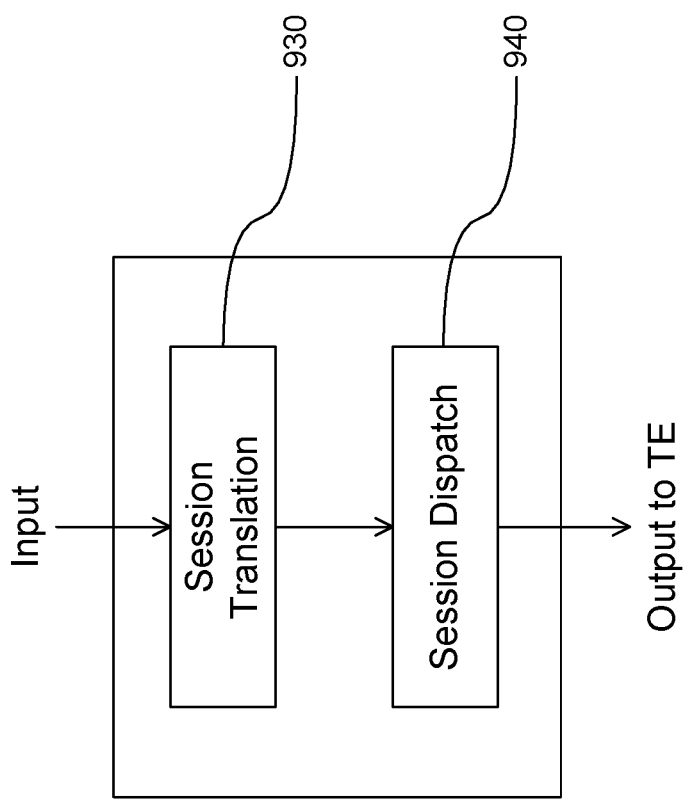
FIG. 15 schematically illustrates the flow-level software defined topology in accordance with embodiments of the present invention.

An example of the flow-level software defined topology is illustrated in FIG. 15, according to an embodiment. The diagram includes an input which flows into session translation 930, which flows into dispatch of the session 940, eventually outputting to the TE.

In one embodiment, it is contemplated that the session translation will be comprised of session segmentation and session segmentation detailing. The session segmentation in an end to end session may be session segments, separated by stateful functions. Each segment may have a function as a source and a stateful function as destinations. The two flow ends of the segment are regarded as stateful functions and each segment has a convergent constraint. Within the session segment detailing, the session segment is a collection of anycast flows. Each anycast flow starts from a distinct PoP of the source end function and ends at all the PoPs of the target end function. The session segment's convergence constraint is applied to the collection of anycast flows. The anycast flows of two adjacent sessions segments may be connected by a connection constraint at common function PoPs.

An example of the flow dispatch as represented in multi-variable equations is illustrated in Equation Set 1 below, according to an embodiment. Equation Set 1 is a MCF problem variant where a maximum concurrent flow formulation is based on the logical topology computed by Service-level SDT, assuming no VNFs change traffic rate.

An example of the adapting session level software defined topology in a multi-variable equation is illustrated in Equation 2 below, according to an embodiment. This problem formulation is obtained by extending the session dispatch problem formulation with migration cost minimization, assuming dedicated control channels for state migration. This formulation is based on the logical topology computed by Service-level SDT, assuming no VNFs change traffic rate.

EQUATION 2

$$\underset{a>=0, b\in\{0,1\}}{\text{maximize}} \min_{f\in F} \frac{a_f}{d_f} - \sum_{f\in F}\sum_{\phi\in \Phi}\sum_{p\in P^\phi} b_p^f w_\phi^f \rho(p_\phi^f, p)$$

where:

$w$ is a amount of state function $f$ is a migration cost factor between PoPs $p$ is a current function PoP associated with the session

EQUATION SET 1

$$\underset{a>=0, b\in\{0,1\}}{\text{maximize}} \min_{f\in F} \frac{a_f}{d_f}$$

Link capacity: $\sum_{f\in F} a_f(u, v) \le c(u, v), \forall (u, v) \in E$

Flow conservation: $\sum_{u\ne s_f, (u,w)\in E} a_f(u, w) = \sum_{v\notin t_f, (w,v)\in E} a_f(w, v), \forall w \in R, \forall f \in F$ $$\sum_{(s_f, u)\in E} a_f(s_f, u) = \sum_{t\in t_f}\sum_{(v,t)\in E} a_f(v, t) = a_f, \forall f \in F$$

Flow connection: $\sum_{\substack{g\in Prev(f): \\ s_f \in t_g}} \sum_{(u,s_f)\in E:} a_g(u, s_f) = \sum_{(s_f,v)\in E} a_f(s_f, v), \forall f \in F$ Flow convergence: $\sum_{(v,p)\in E} a_f(v, p) \le M b_p^f, \forall f \in F: p \in t_f, \forall p \in P^\phi, \forall \phi \in \Phi$ $$\sum_{p\in P^\phi} b_p^f = 1, \forall \phi \in \Phi, \forall f \in F$$

DC capacity: $\sum_{f\in F}\sum_{(v,p)\in E} a_f(v, p) \le r_p, \forall p \in P$ Flow satisfaction: $a_f \le d_f, \forall f \in F$ where:

$E$ is a logical link set $F$ is a translated flow set $P^\Phi$ is a stateful VNF PoP set $\varepsilon^\Phi$ is a statful VNF set $M$ is a very large constant $P$ is a total NVF PoP set $r_p$ is data processing capacity According to certain embodiments, all of the depicted elements may be utilized, or only a subset of the elements. Further, the processing system may contain multiple instances of certain elements, such as multiple processors, memories, or transceivers.

In embodiments, it is contemplated that in cooperation with third party service providers, an application server can be deployed in an operator's network to provide third party services with critical requirements on bandwidth and delay for the users nearby. The mobile network may be able to automatically and dynamically control and allocate network resources, such as but not limited to setting up, capacity expansion or contraction, and removal of network function. The capacity of networks elements may be flexibly adjusted based on variation of demand. Existing mechanisms such as but not limited to load balancing, and network function, which are closely related to network scalability will be enhanced; resiliency against network congestion and disasters will be enhanced through this added flexibility.

Further details of solutions to enabling selection and reselection of efficient user plane paths are included as Appendix A, which is incorporated by reference herein in its entirety.

Figure 16:
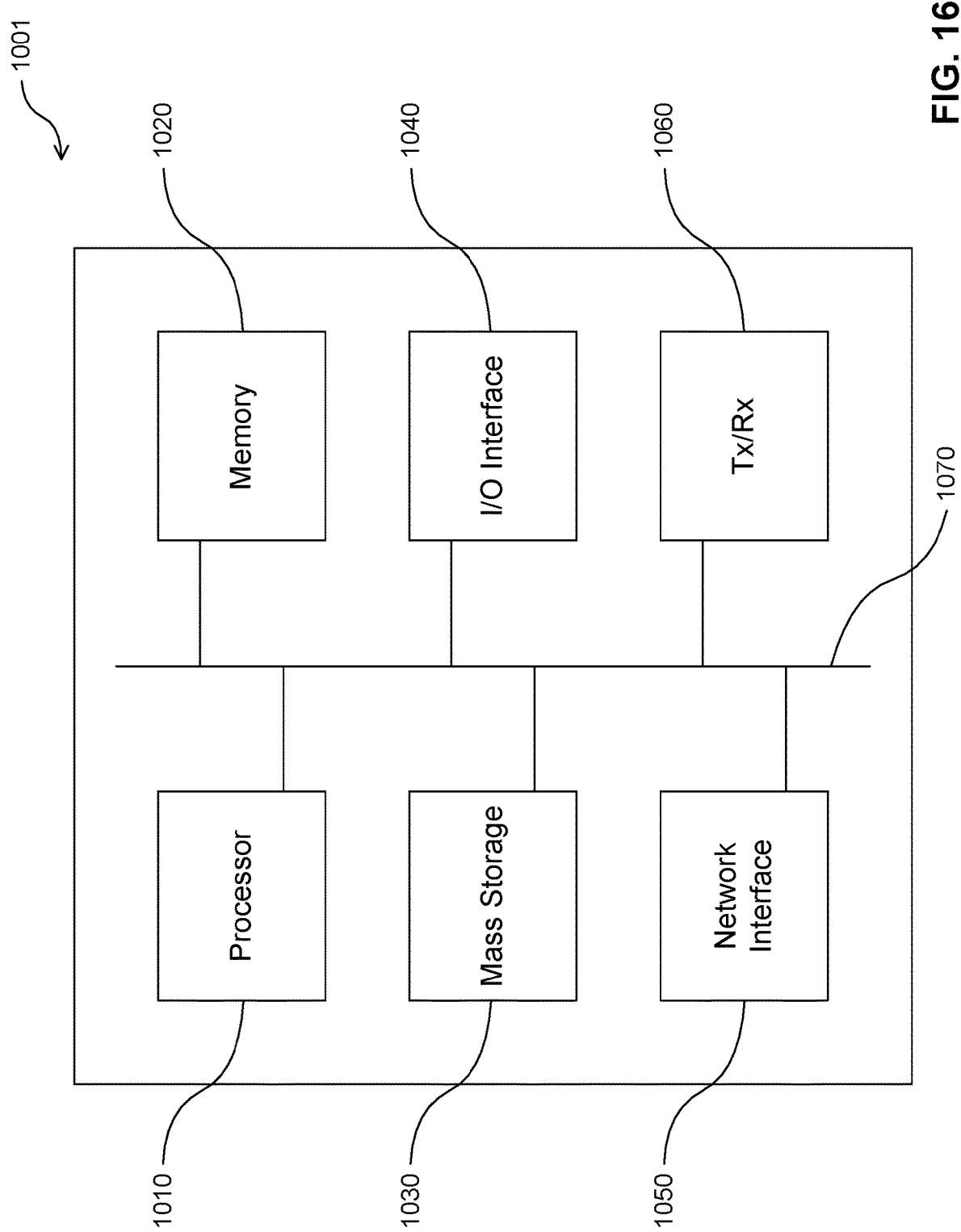
FIG. 16 illustrates a node at which one or more SDT components and SDN components can be instantiated in accordance with embodiments of the present invention.

FIG. 16 is a block diagram of a processing system or device 1001 that may be used for implementing the various network elements which instantiate the SDT components and SDN components, for example Service-level SDT components and Session-level SDT components. As shown in FIG. 16, processing system or device 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system or device 1001 may contain multiple instances of certain elements, such as multiple processors, memories, or transceivers. Also, elements of processing system 1001 may be directly coupled to other components without the bi-directional bus The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

According to embodiments, the memory or the mass storage or both, store machine executable instructions which when executed by the processor, configure the processing system or device to configure a data plane of a communication network.

According to some embodiments, the executable instructions, when executed configure the processing system or device to receive configuration parameters and resource parameters indicative of communication network operation. The executable instructions, when executed further configure the processing system or device to determine a service-level SDT decision based at least in part on the configuration parameter and resource parameters and subsequently transmit configuration parameters and resource parameters to a session-level SDT component for use in a session-level SDT determination. In addition, the executable instructions, when executed further configure the processing system or device to receive performance indicators and a service request regarding configuration of the data plane from the session-level SDT component.

According to some embodiments, the executable instructions, when executed configure the processing system or device to receive configuration parameters and resource parameters from a service-level SDT component, for use in a session-level SDT determination and subsequently determine a session-level SDT decision based at least in part on the configuration parameters and resource parameters. In addition, the executable instructions, when executed, further configure the processing system or device to transmit performance indicators and a service request regarding configuration of the data plane to the service-level SDT component.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Various embodiments of the present disclosure utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for managing a communication network, the method comprising:
   receiving, by a service-level software defined topology (SDT) component, configuration parameters and resource parameters indicative of operation of the communication network;
   determining, by the service-level SDT component, a service-level SDT for a service based at least in part on the configuration parameters and resource parameters, wherein the service-level SDT for the service is a network logical topology which includes virtual function points of presence (VF-PoPs) for the service and logical links for the VF-PoPs for the service;
   transmitting, by the service-level SDT component, the service-level SDT for the service, the configuration parameters and the resource parameters to a session-level SDT component for use in determination of a set of VF-PoPs from the VF-PoPs included in the service-level SDT for a session for the service through which data traffic is routed, and performance indicators and service request regarding a session-level SDT for the session; and
   receiving, by the service-level SDT component, the performance indicators and the service from the session-level SDT component.

2. The method according to claim 1, wherein one or more of the configuration parameters and resource parameters received by the service-level SDT component are modified when determining the service-level SDT and wherein the configuration parameters and resource parameters transmitted by the service-level SDT component include the one or more configuration parameters and resource parameters that were modified.

3. The method according to claim 1, wherein the configuration parameters and resource parameters received by the service-level SDT component are unmodified when determining the service-level SDT and wherein the configuration parameters and resource parameters transmitted by the service-level SDT component include the configuration parameters and resource parameters received by the service-level SDT component.

4. The method according to claim 1, further comprising:
   transmitting, by the service-level SDT component, the performance indicators;
   receiving, by the service-level SDT component, updated resource parameters and updated configuration parameters; and
   transmitting, by the service-level SDT component, the updated resource parameters and updated configuration parameters.

5. The method according to claim 1, wherein the service-level SDT component is operative within an operations support system/business support system (OSS/BSS).

6. The method according to claim 1, wherein the service-level SDT component communicates with the session-level SDT component via the OSS/BSS.

7. The method according to claim 1, further comprising transmitting, by the service-level SDT component, the service-level SDT to a traffic engineering component.

8. The method according to claim 1, further comprising transmitting the service-level SDT to a traffic engineering component except when a special session request is received, wherein a special session requires a guaranteed level of network performance.

9. A device for managing a communication network, the device comprising:
   a processor; and
   machine readable memory storing machine executable instructions which when executed by the processor configure the device to:
      receive configuration parameters and resource parameters indicative of operation of the communication network;
      determine a service-level software defined topology SDT for a service based at least in part on the configuration parameters and resource parameters, wherein the service-level SDT for the service is a network logical topology which includes virtual function points of presence (VF-PoPs) for the service and logical links for the VF-PoPs for the service;
      transmit the service-level SDT for the service, the configuration parameters and the resource parameters to a session-level SDT component for use in determination of a set of VF-PoPs from the VF-PoPs included in the service-level SDT for a session for the service through which data traffic is routed, and performance indicators and service request regarding a session-level SDT for the session; and
      receive the performance indicators and the service request from the session-level SDT component.

10. The device according to claim 9, wherein the machine readable memory further includes executable instructions to transmit the service-level SDT to a traffic engineering component.

11. A method for configuring a data plane of a communication network,
    the method comprising:
    receiving, by a session-level software defined topology (SDT) component, a service-level SDT for a service, configuration parameters and resource parameters from a service-level SDT component, for use in a session-level SDT determination;
    determining, by the session-level SDT component, a session-level SDT for a session for the service through which data traffic is routed based at least in part on the service-level SDT for the service, the configuration parameters and resource parameters, the service-level SDT comprising a set of VF-PoPs from the VF-PoPs included in the service-level SDT;
    determining, by the session-level SDT component, performance indicators and a service request regarding configuration of the session-level SDT for the session; and
    transmitting, by the session-level SDT component, the performance indicators and the service request regarding configuration of the session-level SDT for the session.

12. The method according to claim 11, further comprising receiving, by the session-level SDT component, updated resource parameters and configuration parameters indicative of updated operation of the communication network.

13. The method according to claim 11, wherein the session-level SDT component communicates with a service-level SDT component via an operations support system/business support system (OSS/BSS).

14. The method according to claim 11, further comprising transmitting, by the session-level SDT component, the session-level SDT to traffic engineering component when a special session request is received, wherein a special session requires a guaranteed level of network performance.

15. The method according to claim 11, further comprising transmitting, by the session-level SDT component, instructions to an extended network address translation (ENAT) component, for supporting non-address based forwarding of packets at a session level.

16. A device for managing a communication network, the device comprising:
a processor; and
machine readable memory storing machine executable instructions which when executed by the processor configure the device to:
receive a service-level software defined topology (SDT) for a service, configuration parameters and resource parameters indicative of operation of the communication network, wherein the service-level SDT for the service is a network logical topology which includes virtual function points of presence (VF-PoPs) for the service and logical links for the VF-PoPs for the service;
determine a session-level SDT for a session for the service through which data traffic is routed based at least in part on the service-level SDT for the service, the configuration parameters and resource parameters, the service-level SDT comprising a set of VF-PoPs from the VF-PoPs included in the service-level SDT;
determine performance indicators and a service request regarding configuration of the session-level SDT for the session; and
transmit performance indicators and a service request regarding configuration of the data plane.

17. The device according to claim 16, wherein the machine readable memory further includes executable instructions to receive updated resource parameters and configuration parameters indicative of updated operation of the communication network.

18. The device according to claim 16, wherein the session-level SDT component communicates with a service-level SDT component via an operations support system/business support system (OSS/BSS).

19. The device according to claim 16, wherein the machine readable memory further includes executable instructions to transmit to the session-level SDT to traffic engineering component when a special session request is received, wherein a special session requires a guaranteed level of network performance.

20. The device according to claim 16, wherein the machine readable memory further includes executable instructions to transmit instructions to an extended network address translation (ENAT) component, for supporting non-address based forwarding of packets at a session level.

* * * * *

UNITED STATES PATENT AND TRADEMARK OFFICE
CERTIFICATE OF CORRECTION

PATENT NO. : 10,681,150 B2
APPLICATION NO. : 15/470443
DATED : June 9, 2020
INVENTOR(S) : Xu Li and Jaya Rao Page 1 of 1

It is certified that error appears in the above-identified patent and that said Letters Patent is hereby corrected as shown below:

In the Specification

Column 8, Line 60:
"OSSMSS" should read --OSS/BSS--

Column 9, Line 3:
"SIAM" should read --SMM--

Column 12, Line 39:
"FIG. 17 below illustrates" should read --FIG. 17 illustrates--

Column 13, Line 52:
"FIG. 18 below illustrates" should read --FIG. 18 illustrates--

Signed and Sealed this
Twenty-ninth Day of December, 2020

Andrei Iancu
*Director of the United States Patent and Trademark Office*